United States Patent
Sui et al.

(10) Patent No.: US 11,308,965 B2
(45) Date of Patent: Apr. 19, 2022

(54) VOICE INFORMATION PROCESSING METHOD AND APPARATUS, AND TERMINAL

(71) Applicant: Huawei Technologies Co., Ltd., Shenzhen (CN)

(72) Inventors: Zhicheng Sui, Moscow (RU); Yanming Li, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 127 days.

(21) Appl. No.: 16/754,540

(22) PCT Filed: Oct. 13, 2017

(86) PCT No.: PCT/CN2017/106168
§ 371 (c)(1),
(2) Date: Apr. 8, 2020

(87) PCT Pub. No.: WO2019/071607
PCT Pub. Date: Apr. 18, 2019

(65) Prior Publication Data
US 2020/0273463 A1    Aug. 27, 2020

(30) Foreign Application Priority Data
Oct. 9, 2017  (CN) .......................... 201710931504.9

(51) Int. Cl.
G10L 15/26    (2006.01)
G10L 15/18    (2013.01)
(52) U.S. Cl.
CPC .......... G10L 15/26 (2013.01); G10L 15/1815 (2013.01)
(58) Field of Classification Search
None
See application file for complete search history.

(56) References Cited

U.S. PATENT DOCUMENTS 8,326,599 B2 * 12/2012 Tomeh ................... G06F 40/44
                                                           704/4
9,189,749 B2    11/2015 Estes
9,269,354 B2     2/2016 Gandrabur et al.
9,318,108 B2     4/2016 Gruber et al.
(Continued)

FOREIGN PATENT DOCUMENTS

CN       1719438 A      1/2006
CN     101587493 A     11/2009
(Continued)

OTHER PUBLICATIONS

Yue_Wen, F., et al, "Confidence Measures Based on Word Lattice for Speech Recognition," Computer Engineering and Applications, vol. 36, No. 12, Dec. 2006, 4 pages.
(Continued)

*Primary Examiner* — Neeraj Sharma
(74) *Attorney, Agent, or Firm* — Conley Rose, P.C.

(57) ABSTRACT

A voice information processing method includes: receiving, by a terminal, voice information, and converting the voice information into text information; obtaining a field probability that the text information belongs to each of preset M event fields; obtaining a prior probability that the text information belongs to each of N event fields, where N≤M; obtaining confidence that the text information belongs to each of the N event fields; calculating, based on the field probability, the prior probability, and the confidence that the text information belongs to each of the N event fields, values of N probabilities that the text information separately belongs to the N event fields; and outputting a semantic understanding result of performing semantic understanding based on an event field corresponding to a largest probability value in the N probability values.

20 Claims, 17 Drawing Sheets

(56) References Cited

U.S. PATENT DOCUMENTS

| | | | |
|---|---|---|---|
| 9,805,713 B2* | 10/2017 | Biadsy | G10L 15/08 |
| 9,881,603 B2* | 1/2018 | Kim | G10L 13/07 |
| 10,777,192 B2 | 9/2020 | Qu et al. | |
| 2003/0055655 A1* | 3/2003 | Suominen | G06F 3/167 |
| | | | 704/276 |
| 2004/0030551 A1* | 2/2004 | Marcu | G06F 40/45 |
| | | | 704/240 |
| 2007/0033005 A1 | 2/2007 | Cristo et al. | |
| 2008/0052080 A1 | 2/2008 | Narayanan | |
| 2009/0222329 A1 | 9/2009 | Ramer et al. | |
| 2012/0191719 A1 | 7/2012 | Musgrove et al. | |
| 2012/0278060 A1 | 11/2012 | Cancedda et al. | |
| 2013/0031476 A1* | 1/2013 | Coin | G06F 40/56 |
| | | | 715/706 |
| 2013/0060570 A1* | 3/2013 | Williams | G10L 15/063 |
| | | | 704/251 |
| 2014/0358533 A1* | 12/2014 | Kurata | G10L 15/01 |
| | | | 704/231 |
| 2016/0133251 A1 | 5/2016 | Kadirkamanathan et al. | |
| 2016/0148612 A1 | 5/2016 | Guo et al. | |
| 2017/0148434 A1* | 5/2017 | Monceaux | B25J 11/0015 |

FOREIGN PATENT DOCUMENTS

| | | |
|---|---|---|
| CN | 104050160 A | 9/2014 |
| CN | 104424290 A | 3/2015 |
| CN | 105378830 A | 3/2016 |
| CN | 105632487 A | 6/2016 |
| CN | 105869629 A | 8/2016 |
| CN | 106095834 A | 11/2016 |
| CN | 106205607 A | 12/2016 |
| CN | 106407333 A | 2/2017 |
| CN | 107004140 A | 8/2017 |
| CN | 107092593 A | 8/2017 |
| CN | 107193973 A | 9/2017 |
| EP | 2752763 A2 | 7/2014 |
| WO | 2017100023 A1 | 6/2017 |

OTHER PUBLICATIONS

Wang, D., et al., "Term-Dependent Confidence Normalisation for Out-of-Vocabulary", Journal of Computer Science and Technology 27(2): 358-375, Mar. 2012, DOI 10.1007/s11390-012-1228-x, 18 pages.

Kobashikawa, S. et al., "Efficient data selection for spoken document retrieval based on prior confidence estimation using speech and context independent models," IEEE Spoken Language Technology Workshop, 2010, 6 pages.

Matsuyama, K., "Analyzing User Utterances in Barge-in-able Spoken Dialogue System for Improving Identification Accuracy," Interspeech, Makuhari, Chiba, Japan, Sep. 26-30, 2010, 4 pages.

* cited by examiner

VOICE INFORMATION PROCESSING METHOD AND APPARATUS, AND TERMINAL

CROSS-REFERENCE TO RELATED APPLICATIONS

This application is a national stage of International Patent Application No. PCT/CN2017/106168 filed on Oct. 13, 2017, which claims priority to Chinese Patent Application No. 201710931504.9 filed on Oct. 9, 2017. Both of the aforementioned applications are hereby incorporated by reference in their entireties.

TECHNICAL FIELD

Embodiments of this application relate to the field of computer technologies, and in particular, to a voice information processing method and apparatus, and a terminal.

BACKGROUND

With the development of electronic technologies, an intelligent terminal has more functions. For example, a terminal may provide a voice dialogue function for a user. To be specific, the terminal may receive voice information example, "open a map application") input by the user, perform semantic understanding on the voice information, and then execute an event (open the map application in the terminal, for example, the Baidu map) corresponding to a semantic understanding result.

Generally, due to a limited processing capability of the terminal, the terminal may send the received voice information to a cloud server, and the cloud server performs semantic understanding on the voice information to obtain a semantic understanding result. Then, the cloud server may instruct the terminal to execute an event corresponding to the semantic understanding result.

However, in the foregoing speech recognition process, the terminal needs to perform data exchange with the cloud server at least twice, and due to a cause such as a network failure, the data exchange between the terminal and the cloud server may lead to a result that the terminal cannot execute in a timely manner the event corresponding to the semantic understanding result. In addition, because the voice information usually includes a relatively large data volume, a large amount of network traffic is consumed.

SUMMARY

Embodiments of this application provide a voice information processing method and apparatus, and a terminal, to reduce network traffic consumed by a cloud server to perform semantic understanding.

According to a first aspect, an embodiment of this application provides a voice information processing method. The voice information processing method includes: receiving, by a terminal, voice information, and converting the voice information into text information, where M event fields are preset in the terminal; obtaining a field probability that the text information belongs to each of the M event fields, where the field probability that the text information belongs to an event field is used to represent a possibility that the text information belongs to the event field; obtaining a prior probability that the text information belongs to each of N event fields, where the prior probability that the text information belongs to an event field is used to represent a probability, determined based on a plurality of times of semantic understanding that have been performed, that the text information belongs to the event field, the N event fields are N of the M event fields, and N is less than or equal to M; obtaining confidence that the text information belongs to each of the N event fields, where the confidence that the text information belongs to an event field is used to represent a certainty degree that the text information belongs to the event field; calculating, based on the field probability, the prior probability, and the confidence that the text information belongs to each of the N event fields, values of N probabilities that the text information separately belongs to the N event fields; and outputting a semantic understanding result of performing semantic understanding on the text information based on an event field corresponding to a largest probability value in the N probability values. Optionally, the outputting a semantic understanding result of performing semantic understanding on the text information based on an event field corresponding to a largest probability value in the N probability values may be replaced with: using, as a final semantic understanding result, a semantic understanding result of performing semantic understanding on the text information based on an event field corresponding to a largest probability value in the N probability values.

The prior probability that the text information belongs to an event field is used to represent the probability that the text information belongs to the event field in historical data; the field probability that the text information belongs to an event field is used to represent the possibility that the text information belongs to the event field; and the confidence that the text information belongs to an event field is used to represent the certainty degree that the text information belongs to the event field. In this embodiment of this application, an event field used to process the text information is selected with reference not only to a field probability obtained by analyzing a vocabulary included in the text information, but also to a prior probability that the text information belongs to the event field and confidence that the text information belongs to the event field. Therefore, accuracy of the selected event field can be improved, and accuracy of a semantic understanding result can be improved, thereby improving conformity between an event executed by the terminal and an event that the voice information input by the user instructs the terminal to execute, and improving user experience.

In a possible design method, when N is less than M, the N event fields are the first N event fields in the preset M event fields that are arranged in descending order of the field probabilities, and N≥2. Specifically, the terminal may select, from the M event fields, event fields corresponding to the first N field probabilities in the field probabilities arranged in descending order.

It may be understood that after selecting the N event fields from the M event fields, the terminal needs to calculate only the prior probabilities and the confidence that the text information belongs to the N event fields, and does not need to calculate prior probabilities or confidence that the text information belongs to all of the M event fields, to reduce a calculation amount when the terminal processes the voice information, and improve calculation efficiency.

In another possible design method, after the obtaining, by the terminal, a field probability that the text information belongs to each of the M event fields, the method in this embodiment of this application further includes: separately performing, by the terminal, semantic understanding on the text information in the N event fields, to obtain N semantic understanding results.

After recognizing a field of the text information, the terminal may transmit the text information to a dialogue engine of the recognized event field, and the dialogue engine performs semantic understanding on the text information, to obtain a semantic understanding result: Alternatively, a sequence of performing, by the terminal, field recognition and semantic understanding may not be limited in this embodiment, and field recognition and semantic understanding may be performed at the same time or approximately at the same time, or field recognition may be performed after semantic understanding.

In another possible design method, each of the M event fields corresponds to one keyword model, and the keyword model includes a plurality of keywords of the corresponding event field. Specifically, the obtaining, by the terminal, confidence that the text information belongs to each of the N event fields may include: performing, by the terminal, segmentation processing on the text information, and extracting at least one segmented word; obtaining information about distribution of a keyword corresponding to the at least one segmented word in the keyword model of each event field; and calculating, based on the distribution information, the confidence that the text information belongs to each of the N event fields.

In another possible design method, the obtaining, by the terminal, a field probability that the text information belongs to each of the M event fields includes: performing, by the terminal, segmentation processing on the text information, and extracting at least one segmented word; searching a database model corresponding to each event field for a feature corresponding to the at least one segmented word, where the database model includes a plurality of features, a weight of each feature, and a segmented word corresponding to each feature, the weight is used to indicate a probability that a feature corresponding to the weight belongs to an event field corresponding to the database model, and each event field corresponds to one database model; and calculating, based on the weight of the feature found in the database model corresponding to each event field, the field probability that the text information belongs to each event field.

In the feature database, a same segmented word has a same feature in database models of different event fields; in other words, a feature of a segmented word can uniquely identify the segmented word in the feature database: However, a same segmented word has different weights in different event fields.

In another possible design method, each of the M event fields corresponds to one keyword model, and the keyword model includes a plurality of keywords and a probability, indicated by each keyword, that the text information belongs to an event field corresponding to the keyword model; and the obtaining, by the terminal, a field probability that the text information belongs to each of the M event fields includes: recognizing at least one keyword from the text information; obtaining, from the keyword model corresponding to each event field, a probability indicated by the at least one keyword; and calculating, based on the probability indicated by the at least one keyword, the field probability that the text information belongs to each event field.

Because the at least one keyword may include keywords in the keyword models of the event fields, and the keywords may indicate, in the keyword models of different event fields, probabilities that the text information belongs to the corresponding event fields, the field probability that the text information belongs to each event field may be calculated based on the probability indicated by the keyword that is of each event field and that is included in the text information.

In another possible design method, the method in this embodiment of this application may further include: after outputting the semantic understanding result; performing, by the terminal based on the semantic understanding result, an operation corresponding to the semantic understanding result.

According to a second aspect, an embodiment of this application provides a voice information processing apparatus. The voice information processing apparatus includes a receiving unit, a conversion unit, a first obtaining unit, a second obtaining unit, a third obtaining unit, a calculation unit, and an output unit. The receiving unit is configured to receive voice information. The conversion unit is configured to convert the voice information received by the receiving unit into text information, where M event fields are preset in the terminal. The first obtaining unit is configured to obtain a field probability that the text information obtained by the conversion unit through conversion belongs to each of the M event fields, where the field probability is used to represent a possibility that the text information belongs to an event field. The second obtaining unit is configured to obtain a prior probability that the text information obtained by the conversion unit through conversion belongs to each of N event fields, where the prior probability is used to represent a probability, determined based on a plurality of times of semantic understanding that have been performed, that the text information belongs to an event field; the N event fields are N of the M event fields, and N is less than or equal to M. The third obtaining unit is configured to obtain confidence that the text information obtained by the conversion unit through conversion belongs to each of the N event fields, where the confidence is used to represent a certainty degree that the text information belongs to an event field. The calculation unit is configured to calculate, based on the field probability obtained by the first obtaining unit that the text information belongs to each of the N event fields, the prior probability obtained by the second obtaining unit, and the confidence obtained by the third obtaining unit, values of N probabilities that the text information separately belongs to the N event fields. The output unit is configured to output a semantic understanding result of performing semantic understanding on the text information based on an event field corresponding to a largest probability value in the N probability values obtained by the calculation unit through calculation.

In a possible design method, when N is less than M, the N event fields are the first N event fields in the preset M event fields that are arranged in descending order of the field probabilities, and N≥2.

In another possible design method, the voice information processing apparatus further includes a semantic understanding unit. The semantic understanding unit is configured to: after the first obtaining unit obtains the field probability that the text information belongs to each of the M event fields, separately perform semantic understanding on the text information in the N event fields, to obtain N semantic understanding results.

In another possible design method, the voice information processing apparatus further includes a storage unit. The storage unit is configured to store a keyword model corresponding to each of the M event fields, where the keyword model includes a plurality of keywords of the corresponding event field. The third obtaining unit is specifically configured to: perform segmentation processing on the text information, and extract at least one segmented word; obtain information about distribution of a keyword corresponding to the at least one segmented word in the keyword model that is of each event field and that is stored in the storage unit; and calculate, based on the distribution information, the confidence that the text information belongs to each of the N event fields.

In another possible design method, the first obtaining unit is specifically configured to: perform segmentation processing on the text information, and extract at least one segmented word; search a database model corresponding to each event field for a feature corresponding to the at least one segmented word; where the database model includes a plurality of features, a weight of each feature, and a segmented word corresponding to each feature, the weight is used to indicate a probability that a feature corresponding to the weight belongs to an event field corresponding to the database model, and each event field corresponds to one database model; and calculate, based on the weight of the feature found in the database model corresponding to each event field, the field probability that the text information belongs to each event field.

In another possible design method, the voice information processing apparatus further includes a storage unit. The storage unit is configured to store a keyword model corresponding to each of the M event fields, where the keyword model includes a plurality of keywords and a probability, indicated by each keyword, that the text information belongs to an event field corresponding to the keyword model. The first obtaining unit is specifically configured to: recognize at least one keyword from the text information; obtain, from the keyword model corresponding to each event field, a probability indicated by the at least one keyword; and calculate, based on the probability indicated by the at least one keyword, the field probability that the text information belongs to each event field.

In another possible design method, the voice information processing apparatus further includes a performing unit. The performing unit is configured to: after the output unit outputs the semantic understanding result, perform, based on the semantic understanding result, an operation corresponding to the semantic understanding result.

According to a third aspect, an embodiment of this application provides a terminal. The terminal includes one or more processors and one or more memories, where the one or more memories store one or more computer programs, the one or more computer programs include an instruction, and when the instruction is executed by the one or more processors, the terminal is enabled to perform the voice information processing method in any one of the first aspect or the possible design methods of the first aspect.

According to a fourth aspect, an embodiment of this application provides an electronic device. The electronic device includes an apparatus for performing the voice information processing method in any one of the first aspect or the possible design methods of the first aspect.

According to a fifth aspect, an embodiment of this application provides a computer program product including an instruction. When the computer program product is run on an electronic device, the electronic device is enabled to perform the voice information processing method in any one of the first aspect or the possible design methods of the first aspect.

According to a sixth aspect, an embodiment of this application provides a computer readable storage medium. The computer readable storage medium includes an instruction. When the instruction is mu on an electronic device, the electronic device is enabled to perform the voice information processing method in any one of the first aspect or the possible design methods of the first aspect.

It may be understood that the apparatus in the second aspect, the terminal in the third aspect, the electronic device in the fourth aspect, the computer program product in the fifth aspect, and the computer readable storage medium in the sixth aspect that are provided above are all configured to perform the corresponding method provided above. Therefore, for beneficial effects that can be achieved, refer to beneficial effects of the corresponding method provided above, and details are not described herein again.

DESCRIPTION OF EMBODIMENTS

Figure 1:
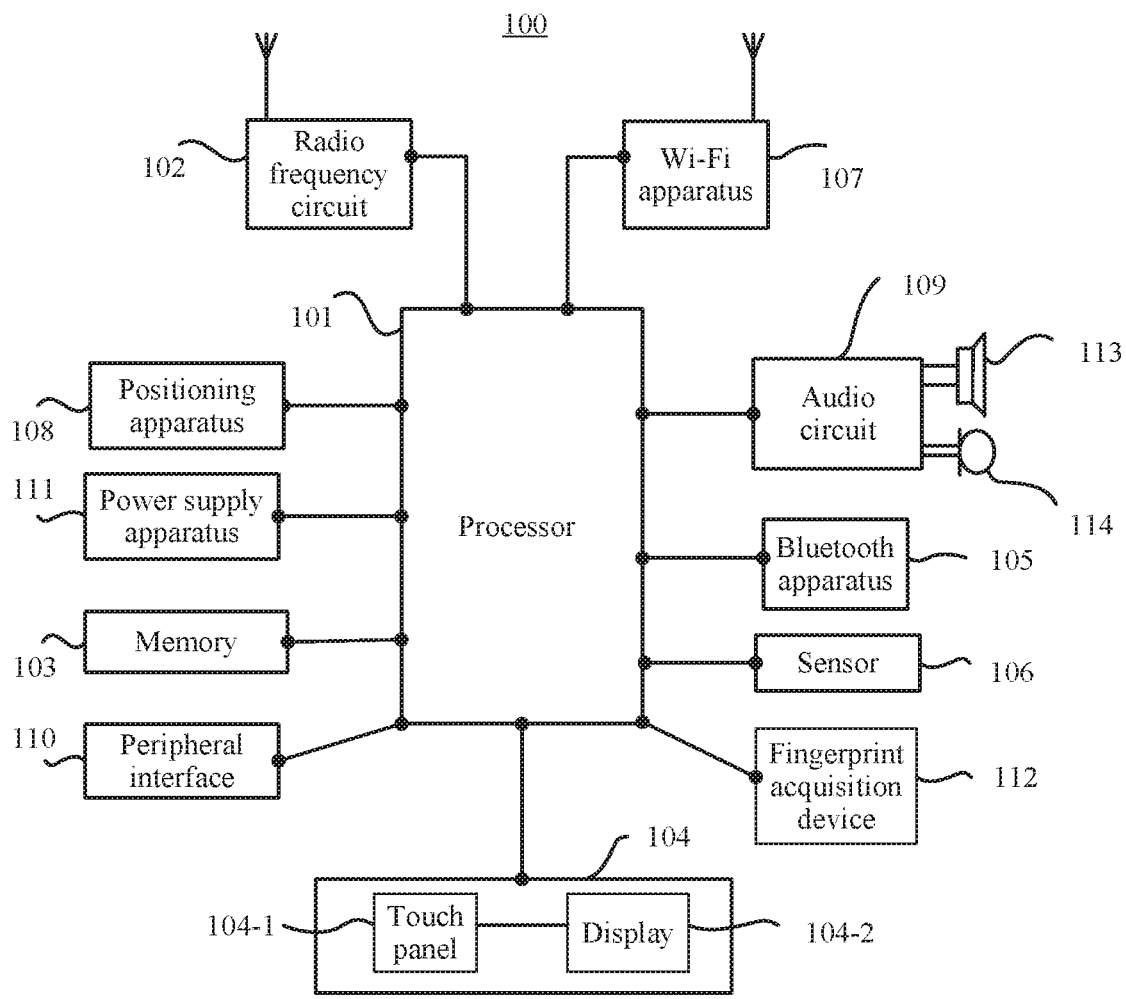
FIG. 1 is a schematic diagram of a hardware structure of a terminal according to an embodiment of this application.

The following terms "first" and "second" are merely intended for a purpose of description, and shall not be understood as an indication or implication of relative importance or implicit indication of a quantity of indicated technical features. Therefore, a feature modified by "first" or "second" may explicitly or implicitly include one or more features. In descriptions of embodiments of this application, unless otherwise stated, "a plurality of" means two or more than two.

The embodiments of this application provide a voice information processing method and a terminal. The method may be applied to a process of a voice dialogue between a terminal and a user. The method is specifically applied to a process in which the terminal receives voice information input by the user, performs semantic understanding on the voice information, and executes an event corresponding to a semantic understanding result, for example, a process in which the user controls the terminal through voice.

In the embodiments of this application, the performing semantic understanding on the voice information may include: converting the voice information into text information, then analyzing the text information, and recognizing an event that the text information instructs the terminal to execute. For example, when the terminal receives voice information "remind me to turn on the flight mode at 22:00" input by the user, the terminal may convert the voice information into text information "remind me to turn on the flight mode at 22:00", and then recognize that an event that the text information instructs the terminal to execute is "send a prompt of 'turning on the flight mode' to the user at 22:00", rather than directly "turn on the flight mode".

In the foregoing speech recognition process, a conventional solution has the following problem: Due to a cause such as a network failure, data exchange between a terminal and a cloud server may lead to a result that the terminal cannot execute in a timely manner an event corresponding to a semantic understanding result. Because voice information usually has a relatively large data volume, the conventional solution consumes a large amount of network traffic. To resolve the problem in the conventional solution, in the voice information processing method provided in the embodiments of this application, semantic understanding may be performed by the terminal.

Generally, when the terminal performs the semantic understanding, the terminal simply analyzes a vocabulary included in text information obtained through conversion, and determines an event field to which the text information belongs, that is, determines the event field to which the text information belongs. Then, a dialogue engine of the event field to which the text information belongs performs semantic understanding on the text information by using a semantic understanding algorithm of the event field, and then the terminal executes an event corresponding to a semantic understanding result.

However, the following problem exists: The event field that is determined by simply analyzing the vocabulary included in the text information may be inaccurate, and the semantic understanding result obtained by the dialogue engine of the inaccurate event field by performing the semantic understanding on the text information by using the semantic understanding algorithm of the inaccurate event field is also inaccurate. As a result, the event that corresponds to the semantic understanding result and that is executed by the terminal may be different from an event that voice information input by the user instructs the terminal to execute, and user experience is affected.

In the embodiments of this application, to not only improve efficiency of executing, by the terminal, an event corresponding to a semantic understanding result and reduce network traffic consumed by a cloud server in semantic understanding but also improve accuracy of performing, by the terminal, semantic understanding on voice information, after the voice information is converted into text information, a prior probability that the text information belongs to each event field may be obtained based on historical data used by the terminal to perform semantic understanding, where the prior probability that the text information belongs to an event field is used to represent a probability that the text information belongs to the event field in the historical data. Then, the text information is analyzed, and a field probability that the text information belongs to each event field is obtained, where the field probability that the text information belongs to an event field is used to represent a possibility that the text information belongs to the event field. Then, the terminal may calculate confidence that the text information belongs to each event field, where the confidence that the text information belongs to an event field is used to represent a certainty degree that the text information belongs to the event field. Then, the terminal may calculate, based on the prior probability, the field probability, and the confidence that the text information belongs to an event field, a value of a probability that the text information belongs to the event field, to obtain a value of a probability that the text information belongs to each event field. Finally, the terminal may use, as a semantic understanding result of the text information (that is, the voice information), a semantic understanding result of performing, by a dialogue engine of an event field corresponding to a largest probability value, semantic understanding on the text information, and the terminal may execute an event corresponding to the semantic understanding result.

In the embodiments of this application, an event field used to process text information is selected with reference not only to a field probability obtained by analyzing a vocabulary included in the text information, but also to a prior probability that the text information belongs to the event field and confidence that the text information belongs to the event field. Therefore, accuracy of the selected event field can be improved, and accuracy of a semantic understanding result can be improved, thereby improving conformity between an event executed by the terminal and an event that voice information input by the user instructs the terminal to execute, and improving user experience.

In the embodiments of this application, the terminal may be a mobile phone (for example, a mobile phone 100 in FIG. 1), a tablet computer, a personal computer (Personal Computer, PC), a personal digital assistant (personal digital assistant, PDA), a smartwatch, a netbook, a wearable electronic device, or the like that allows a user to instruct, by inputting voice information, the terminal to execute a corresponding operation event. A specific form of the device is not specially limited in the embodiments of this application.

In the embodiments of this application, an event field to which text information belongs is a field to which an event that a semantic understanding result of performing semantic understanding on the text information instructs the terminal to execute belongs. For example, the event field in the embodiments of this application may include a music field, a setting field, and an application (Application, APP) field. For example, text information such as "play song a" and "play a next song" belongs to the music field, text information such as "turn down screen brightness" and "turn on the flight mode" belongs to the setting field, and text information such as "open the WeChat" and "navigate to No. 10, A street" belongs to the app field.

As shown in FIG. 1, that the foregoing terminal is the mobile phone 100 is used as an example. The mobile phone 100 may specifically include components such as a processor 101, a radio frequency (Radio Frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply apparatus 111. The components may communicate by using one or more communications buses or signal buses (not shown in FIG. 1). A person skilled in the art may understand that the hardware structure shown in FIG. 1 does not constitute a limitation on the mobile phone. The mobile phone 100 may include more or fewer components than those shown in the figure, or some components may be combined, or a different component arrangement may be used.

The following describes in detail the components of the mobile phone 100 with reference to FIG. 1.

The processor 101 is a control center of the mobile phone 100, connects all parts of the mobile phone 100 by using various interfaces and lines, and executes various functions of the mobile phone 100 and processes data by running or executing an application stored in the memory 103 and invoking data stored in the memory 103. In some embodiments, the processor 101 may include one or more processing units. In some embodiments of the embodiments of this application, the processor 101 may further include a fingerprint verification chip, configured to verify an acquired fingerprint.

The radio frequency circuit 102 may be configured to receive and send radio signals in an information receiving and sending process or a call process. Particularly, the radio frequency circuit 102 may receive downlink data from a base station, and send the downlink data to the processor 101 for processing; and send uplink data to the base station. Generally, the radio frequency circuit includes but is not limited to: an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to: global system for mobile communications, general packet radio service, code division multiple access, wideband code division multiple access, long term evolution, e-mail, short message service, and the like.

The memory 103 is configured to store the application and the data, and the processor 101 executes various functions of the mobile phone 100 and processes data by running the application and the data that are stored in the memory 103. The memory 103 mainly includes a program storage area and a data storage area. The program storage area may store an operating system, and an application required by at least one function (such as an audio play function and an image play function). The data storage area may store data (such as audio data and an address book) created during use of the mobile phone 100. In addition, the memory 103 may include a high-speed random access memory (RAM), or may include a non-volatile memory, for example, a magnetic disk storage device, a flash memory device, or another volatile solid-state storage device. The memory 103 may store various operating systems, for example, the iOS® operating system and the Android® operating system. The memory 103 may be independent, and be connected to the processor 101 by using the communications bus. Alternatively, the memory 103 may be integrated with the processor 101.

The touchscreen 104 may specifically include a touch panel 104-1 and a display 104-2.

The touch panel 104-1 may collect a touch event of a user of the mobile phone 100 on or near the touch panel 104-1 (for example, an operation of the user on or near the touch panel 104-1 by using any suitable object such as a finger or a stylus), and send collected touch information to another device (for example, the processor 101). The touch event of the user near the touch panel 104-1 may be referred to as floating touch control. The floating touch control may mean that the user does not need to directly touch the touch panel to select, move, or drag a target (for example, an icon), but only needs to be near a device to implement a desired function. In addition, the touch panel 104-1 may be a resistive touch panel, a capacitive touch panel, an infrared touch panel, a surface wave sound touch panel, or the like.

The display 104-2 (also referred to as a display screen) may be configured to display information entered by the user or information provided for the user, and various menus of the mobile phone 100. The display 104-2 may be provided in a form of a liquid crystal display, an organic light-emitting diode, or the like. The touch panel 104-1 may cover the display 104-2. When the touch panel 104-1 detects a touch event on or near the touch panel 104-1, the touch panel 104-1 sends the touch event to the processor 101 to determine a type of the touch event. Then, the processor 101 may provide a corresponding visual output on the display 104-2 based on the type of the touch event. Although in FIG. 1, the touch panel 104-1 and the display screen 104-2 are used as two independent components to implement input and output functions of the mobile phone 100, in some embodiments, the touch panel 104-1 and the display screen 104-2 may be integrated to implement the input and output functions of the mobile phone 100. It may be understood that the touchscreen 104 may be formed by stacking a plurality of layers of materials, only the touch panel (layer) and the display screen (layer) are presented in this embodiment of this application, and other layers are not recorded in this embodiment of this application. In addition, the touch panel 104-1 may be disposed on a front face of the mobile phone 100 in a form of a full panel, and the display screen 104-2 may also be disposed on the front face of the mobile phone 100 in a form of a full panel. In this way, a bezel-less structure can be implemented for the front face of the mobile phone.

In addition, the mobile phone 100 may further have a fingerprint recognition function. For example, a fingerprint recognizer 112 may be disposed on a back face (for example, below a back-facing camera) of the mobile phone 100, or a fingerprint recognizer 112 is disposed on the front face (for example, below the touchscreen 104) of the mobile phone 100. For another example, a fingerprint acquisition device 112 may be disposed in the touchscreen 104 to implement a fingerprint recognition function. In other words, the fingerprint acquisition device 112 may be integrated with the touchscreen 104 to implement the fingerprint recognition function of the mobile phone 100. In this case, when disposed in the touchscreen 104, the fingerprint acquisition device 112 may be a part of the touchscreen 104, or may be disposed in the touchscreen 104 in another manner. In this embodiment of this application, a main component of the fingerprint acquisition device 112 is a fingerprint sensor. The fingerprint sensor may use any type of sensing technology, including but not limited to an optical sensing technology, a capacitive sensing technology, a piezoelectric sensing technology, an ultrasonic sensing technology, or the like.

The mobile phone 100 may further include the Bluetooth apparatus 105, configured to implement data exchange between the mobile phone 100 and another short-range device (for example, a mobile phone or a smartwatch). In this embodiment of this application, the Bluetooth apparatus may be an integrated circuit, a Bluetooth chip, or the like.

The mobile phone 100 may further include at least one sensor 106, for example, an optical sensor, a motion sensor, and another sensor. Specifically, the optical sensor may include an ambient light sensor and a proximity sensor. The ambient light sensor may adjust brightness of the display of the touchscreen 104 based on brightness of ambient light. The proximity sensor may turn off a power supply of the display when the mobile phone 100 is moved to an ear. As a type of motion sensor, an accelerometer sensor may detect magnitudes of acceleration in various directions (generally on three axes), may detect a magnitude and direction of gravity in a static state, and may be applied to an application that recognizes a mobile-phone posture (for example, switching between landscape orientation and portrait orientation, a related game, and magnetometer posture calibration), a function related to vibration recognition (such as a pedometer and a knock), and the like. Other sensors that may be further disposed in the mobile phone 100, for example, a gyroscope, a barometer, a hygrometer, a thermometer, and an infrared sensor, are not described herein.

The wireless fidelity (Wireless Fidelity, Wi-Fi) apparatus 107 is configured to provide, for the mobile phone 100, network access conforming to Wi-Fi related standard protocols. The mobile phone 100 may access a Wi-Fi access point by using the Wi-Fi apparatus 107, to help the user to receive and send e-mails, browse webpages, access streaming media, and the like, and provide wireless wideband internet access for the user. In some other embodiments, the apparatus 107 may also be used as a Wi-Fi wireless access point, and may provide Vi-Fi network access for another device.

The positioning apparatus 108 is configured to provide a geographical location for the mobile phone 100. It may be understood that the positioning apparatus 108 may be specifically a receiver of a positioning system such as the global positioning system (Global Positioning System, GPS), the BeiDou navigation satellite system, or the Russian GLONASS. After receiving a geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (Assisted Global Positioning System, AGPS). The AGPS system assists the positioning apparatus 108 as an assistant server, to implement ranging and positioning services. In this case, the assisted positioning server communicates with a device such as the positioning apparatus 108 (that is, the GPS receiver) of the mobile phone 100 by using a wireless communications network, to provide positioning assistance. In some other embodiments, the positioning apparatus 108 may be a positioning technology based on a Wi-Fi access point. Because each access point has a globally unique media access control (Media Access Control, MAC) address, and a device can scan and collect broadcast signals of nearby Wi-Fi access points when Wi-Fi is turned on, the device may obtain MAC addresses that are broadcast by the Wi-Fi access points. The device sends the data (for example, the MAC addresses) that can identify the Wi-Fi access points, to a location server by using the wireless communications network. The location server finds a geographical location of each Wi-Fi access point, calculates a geographical location of the device with reference to strength of the broadcast signals, and sends the geographical location to the positioning apparatus 108 of the device.

The audio circuit 109, a loudspeaker 113, and a microphone 114 may provide audio interfaces between the user and the mobile phone 100. The audio circuit 109 may convert received audio data into an electrical signal, and then transmit the electrical signal to the loudspeaker 113. The loudspeaker converts the electrical signal into a sound signal and outputs the sound signal. In addition, the microphone 114 converts a collected sound signal into an electrical signal, the audio circuit 109 receives the electrical signal, converts the electrical signal into audio data, and outputs the audio data to the RF circuit 102, so that the RF circuit 102 sends the audio data to, for example, another mobile phone, or transmits the audio data to the memory 103 for further processing.

The peripheral interface 110 is configured to provide various interfaces for external input/output devices (for example, a keyboard, a mouse, a peripheral display, an external memory, and a subscriber identification module card). For example, the peripheral interface 110 is connected to the mouse by using a universal serial bus (Universal Serial Bus, USB) interface, or is connected, by using metal contact points on a card slot of a subscriber identification module card, to a subscriber identity module (Subscriber Identification Module, SIM) card provided by a telecommunications operator. The peripheral interface 110 may be configured to couple the external input/output peripheral devices to the processor 101 and the memory 103.

In this embodiment of the present invention, the mobile phone 100 may communicate with another device in a device group by using the peripheral interface 110, for example, may receive, by using the peripheral interface 110, display data sent by another device, and display the display data. This is not limited in this embodiment of the present invention.

The mobile phone 100 may further include the power supply apparatus 111 (for example, a battery and a power supply management chip) supplying power to the components, and the battery may be logically connected to the processor 101 by using the power supply management chip, to manage functions such as charging management, discharging management, and power consumption management by using the power supply apparatus 111.

Although not shown in FIG. 1, the mobile phone 100 may further include a camera (a front-facing camera and/or a back-facing camera), a camera flash, a micro projection apparatus, a near field communication (Near Field Communication, NFC) apparatus, and the like. Details are not described herein.

Figure 2:
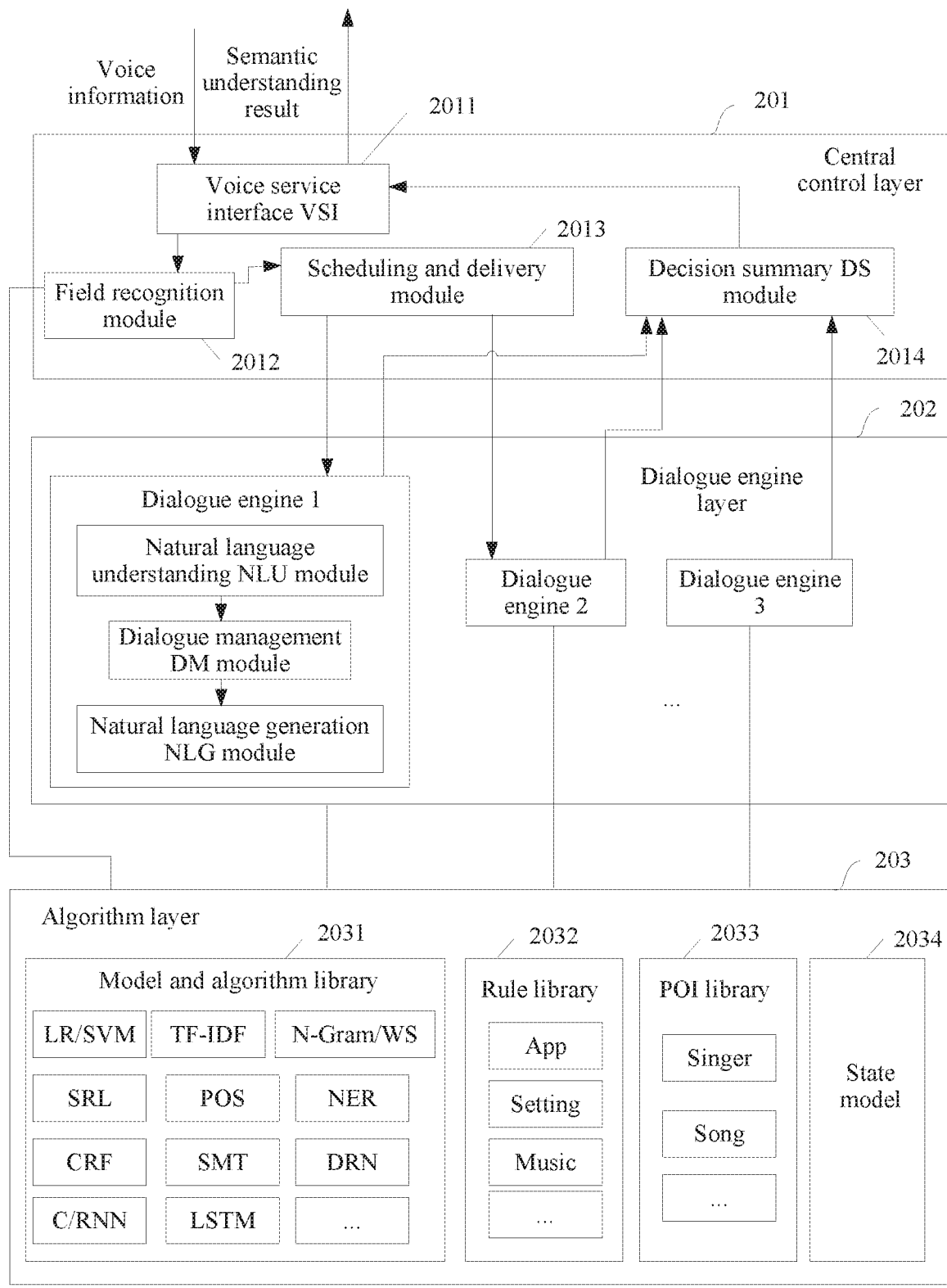
FIG. 2 is a schematic diagram of an architecture used for voice information processing according to an embodiment of this application.

FIG. 2 is a schematic diagram of an architecture used for voice information processing according to an embodiment of this application. The architecture is located in a terminal. As shown in FIG. 2, the architecture includes a central control layer 201, a dialogue engine layer 202, and an algorithm layer 203.

The central control layer 201 includes a voice service interface (Voice Service Interface, VSI) 2011, a field recognition module 2012, a scheduling and delivery module 2013, and a decision summary (Decision Summary, DS) module 2014.

The dialogue engine layer 202 includes at least two dialogue engines. For example, as shown in FIG. 2, the dialogue engine layer 202 includes a dialogue engine 1, a dialogue engine 2, and a dialogue engine 3.

The algorithm layer 203 includes a "model and algorithm library" 2031, a rule (Rule) library 2032, a point of interest (Points Of Interests, POD library 2033, and a state model 2034.

The central control layer 201 is configured to: receive voice information from the VSI 2011 (for example, receive voice information from a third-party application), and then transmit the received voice information to the field recognition module 2012.

Figure 3:
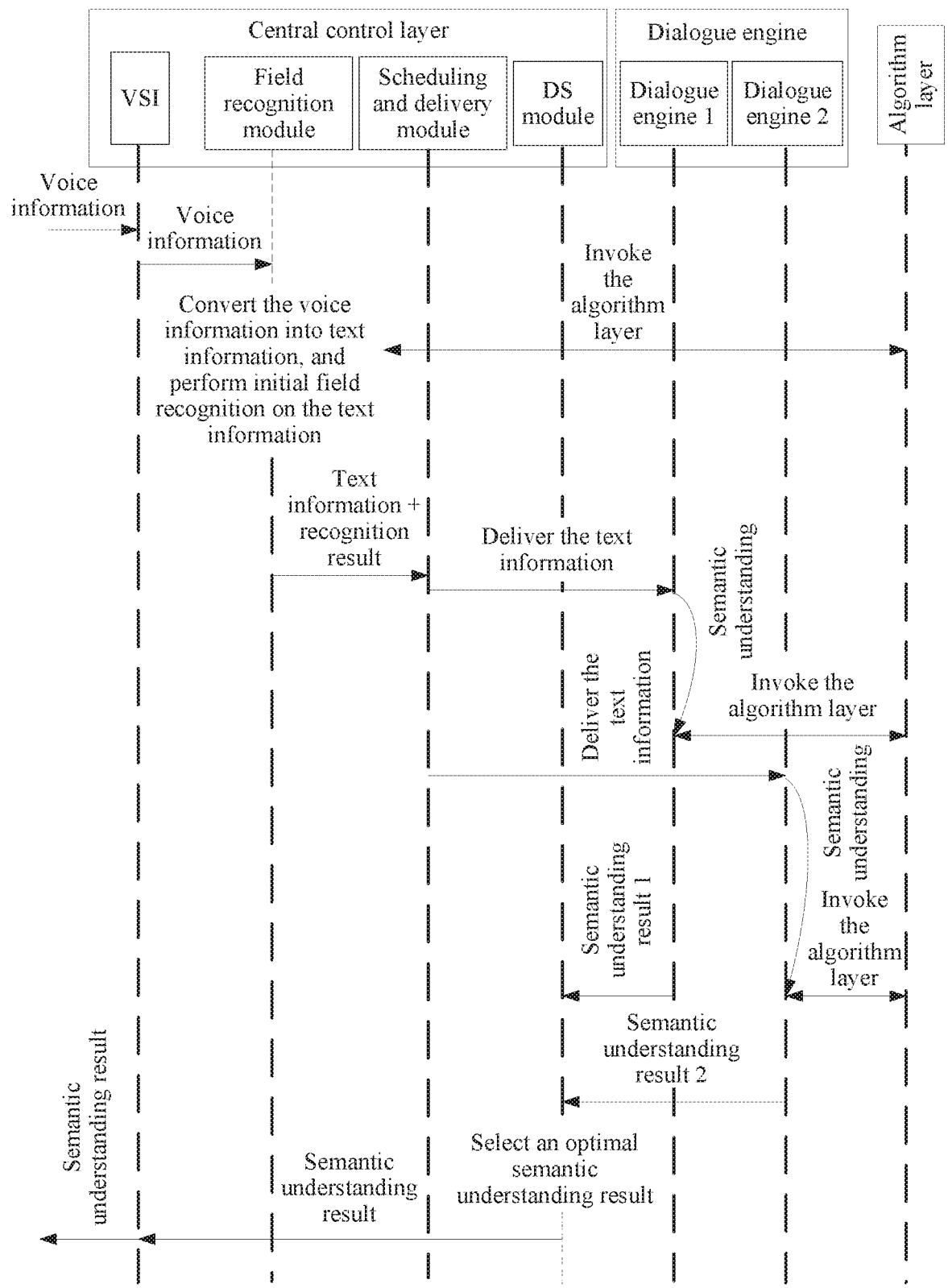
FIG. 3 is a first flowchart of a voice information processing method according to an embodiment of this application.

Referring to FIG. 2 and FIG. 3, the field recognition module 2012 is configured to: convert the received voice information into text information, perform initial field recognition on the text information, recognize at least two possible event fields of the text information, and then transmit a recognition result to the scheduling and delivery module 2013. The field recognition module 2012 may schedule the "model and algorithm library" 2031, the rule (Rule) library 2032, the POI library 2033, and the state model 2034 at the algorithm layer 203, to perform field recognition on the text information.

The "model and algorithm library" 2031 may include a plurality of algorithms (also referred to as models). The plurality of algorithms are used to support the field recognition module 2012 and a dialogue engine (for example, the dialogue engine 1) at the dialogue engine layer 202 to analyze the text information. For example, as shown in FIG. 2, the "model and algorithm library" 2031 at the algorithm layer 203 includes algorithms such as a logistic regression/support vector machine (Logistic Regression/Support Vector Machine, LR/SVM) algorithm, a term frequency-inverse document frequency (Term Frequency-Inverse Document Frequency, TF-IDF) algorithm, an N-Grani/WS (Word Segment, word segment) algorithm, a semantic role label (Semantic Role Label, SRL) algorithm, a part of speech (Part of Speech, POS) algorithm, a named entity recognition (Named Entity Recognition, NER) algorithm, a conditional random field (Conditional Random Field, CRF) algorithm, a statistic machine conversion (Statistic Machine Conversion, SMT) algorithm, a deep reinforcement learning network (Deep Reinforce learning Network, DRN) algorithm, a convolution/recurrent neural net (Convolution/Recurrent Neural Net, C/RNN) algorithm, and a long short term memory (Long Short Term Memory, LSTM) algorithm. The N-Gram is a language model commonly used in large-vocabulary continuous speech recognition, and may be referred to as a Chinese language model (Chinese Language Model, CLM) for Chinese. The Chinese language model may use information about collocation between adjacent words in the context of the voice information, and may implement automatic conversion from the voice information to Chinese characters (that is, the text information).

The rule library 2032 at the algorithm layer 203 may include semantic understanding rules of text information belonging to various event fields. For example, as shown in FIG. 2, the rule library 2032 may include a semantic understanding rule of text information belonging to an app field, a semantic understanding rule of text information belonging to a setting field, and a semantic understanding rule of text information belonging to a music field. A semantic understanding rule of an event field in the rule library 2032 may be used to indicate an algorithm that is to be invoked from the "model and algorithm library" 2031 for performing semantic understanding on text information belonging to the event field. For example, the semantic understanding rule of the app field in the rule library 2032 may be used to indicate that the LR/SVM algorithm and the F-IDF algorithm may be invoked from the "model and algorithm library" when semantic understanding is performed on text information belonging to the app field.

A navigation field is used as an example. The POI library 2033 may be a data set including information such as a name (for example, a restaurant name or a school name), an address (for example, a restaurant address or a school address), a longitude and a latitude, and a category (for example, a school, a restaurant, a government agency, or a shopping mall) of an object for which a rule in the rule library 2032 is used. For example, the POI library 2033 may include a singer, a song, and the like in the semantic understanding rule of the text information belonging to the music field in the rule library 2032. In the POI library 2033, a plurality of data sets may be maintained based on different addresses, or a plurality of data sets may be maintained based on different categories.

The state model 2034 is a model used by a dialogue engine at the dialogue engine layer 202 to manage a dialogue status. The state model 2034 may be a customized model, for example, a determinism model, a probability model, or a Markov model. The state model 2034 may provide transition between different dialogue states in a process of a dialogue between the terminal and a user. For example, the probability model means that after the user inputs voice information, if a value of a probability that text information corresponding to the voice information belongs to the navigation field is greater than a preset value, a result of performing semantic understanding on the text information in the navigation field is input.

The scheduling and delivery module 2013 is configured to deliver the text information to dialogue engines (for example, the dialogue engine 1) corresponding to at least two event fields indicated by the recognition result, and the corresponding dialogue engines separately perform natural language understanding (Natural Language Understanding, NLU), dialogue management (Dialogue Management, DM), and natural language processing (Natural Language Process, NLP) (that is, dialogue generation) on the text information, to obtain voice understanding results of the text information in the corresponding fields.

As shown in FIG. 2, each dialogue engine at the dialogue engine layer 202 corresponds to one event field. For example, the dialogue engine 1 corresponds to the setting field, the dialogue engine 2 corresponds to the app field, and the dialogue engine 3 corresponds to the music field. The dialogue engine 1 is used as an example, and a dialogue engine of each event field may include an NLU module, a DM module, and an NLP module, to perform semantic understanding on text information, to obtain a voice understanding result. Each dialogue engine may invoke a model, an algorithm, a rule, and the like corresponding to the dialogue engine in the model and algorithm library 2031, the rule library 2032, and the POI library 2033 at the algorithm layer 203, to perform semantic understanding on the text information.

Subsequently, each dialogue engine may transmit the obtained semantic understanding result to the DS module 2014. The DS module 2014 performs method steps in the embodiments of this application, to select, from the semantic understanding results fed back by the plurality of dialogue engines, a semantic understanding result (that is, as shown in FIG. 3, an optimal semantic understanding result) corresponding to an event field, where a value of a probability that the text information belongs to the event field is the highest, uses the selected semantic understanding result as a semantic understanding result of the text information, and feeds back the semantic understanding result by using the VSI interface.

It may be understood that functions of the central control layer 201, the dialogue engine layer, and a part of the algorithm layer 203 in FIG. 2 may be integrated into the processor 101 of the mobile phone 100 in FIG. 1 for implementation, and information such as the algorithms and the rules at the algorithm layer 203 in FIG. 2 may be stored in the memory 103 of the mobile phone 100 in FIG. 1. In other words, the architecture used for voice information processing in FIG. 2 may be located in the mobile phone 100 in FIG. 1.

Figure 4:
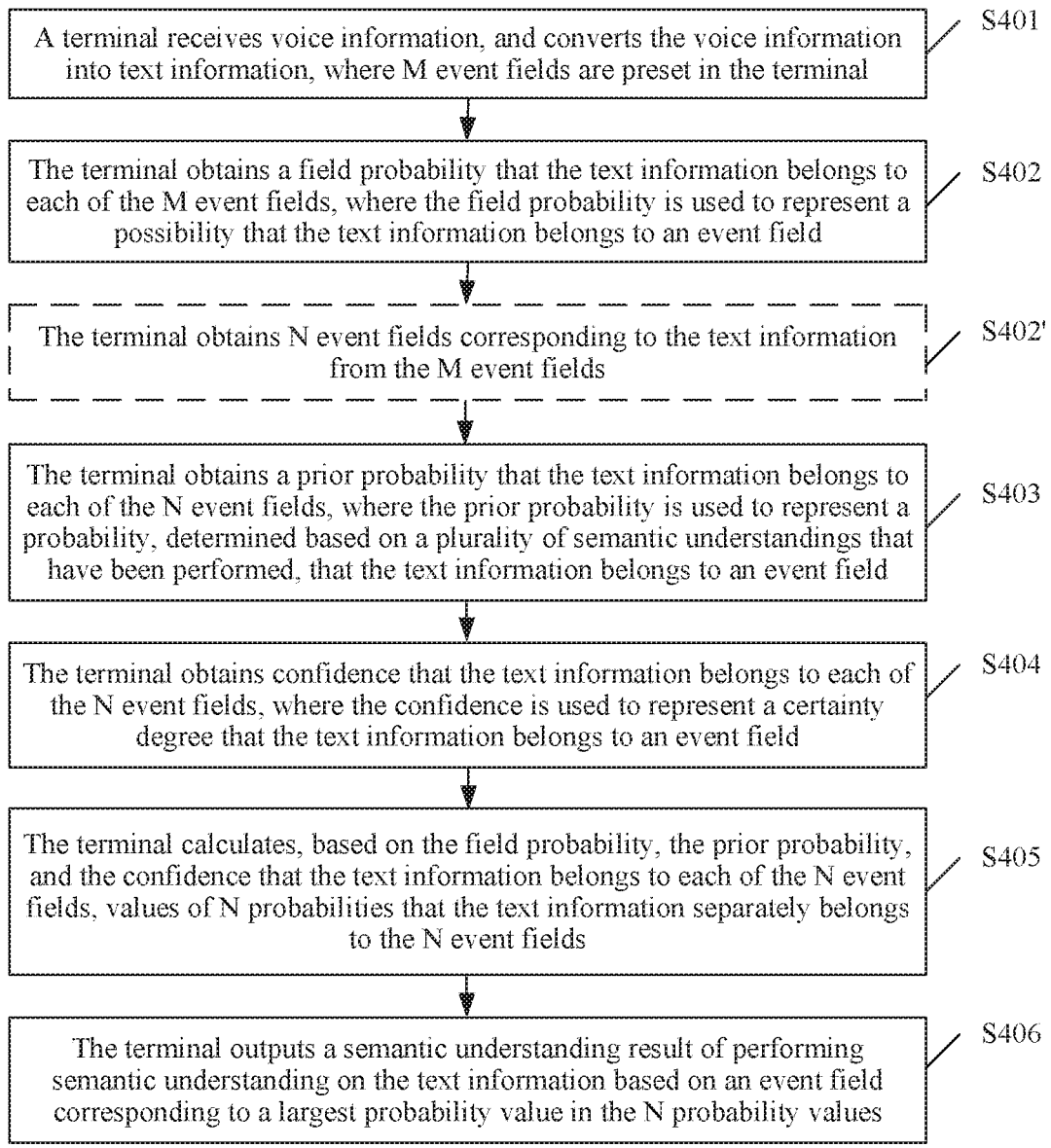
FIG. 4 is a second flowchart of a voice information processing method according to an embodiment of this application.

An embodiment of this application provides a voice information processing method. As shown in FIG. 4, the voice recognition method includes S401 to S406.

S401. A terminal receives voice information, and converts the voice information into text information, where M event fields are preset in the terminal.

In this embodiment of this application, after receiving the voice information, the terminal may invoke a voice-to-text conversion algorithm (for example, an N-Gram/WS algorithm) at the algorithm layer 203 in FIG. 2, to convert the voice information into the text information. Alternatively, the terminal may convert the voice information into the text information by invoking a voice-to-text conversion (voice-to-text, speech-to-text) program. A specific manner of converting the voice information into the text information is not limited in this embodiment of this application. Usually, the voice information received by the terminal is voice made by a user. In other words, the user makes the voice, and then the terminal receives the voice, and then performs a subsequent action.

The M event fields may be preset in the terminal, for example, a music field, a setting field, and an application app field, where M≥2.

S402. The terminal obtains a field probability that the text information belongs to each of the M event fields, where the field probability is used to represent a possibility that the text information belongs to an event field.

The terminal may invoke, by using the field recognition module 2012 at the central control layer 201 in FIG. 2, an algorithm used to perform semantic and syntactic analysis on text information at the algorithm layer 203, to obtain a field probability that the text information belongs to each of N event fields. A higher field probability that the text information belongs to an event field indicates a higher possibility that the text information belongs to the event field.

Optionally, after the terminal performs S402, the terminal may obtain the N event fields corresponding to the text information from the M event fields. Specifically, as shown in FIG. 4, after S402, the method in this application may further include S402'.

S402'. The terminal obtains N event fields corresponding to the text information from the M event fields.

It should be noted that after the terminal performs S402, if the terminal performs S402' of obtaining the N event fields corresponding to the text information from the M event fields, the N event fields in this embodiment of this application are some of the M event fields, where N<M. In this case, the N event fields are the first N event fields in the preset M event fields that are arranged in descending order of the field probabilities, and N≥2. In other words, after performing S402, the terminal may select, from the M event fields, the event fields corresponding to the first N field probabilities in the field probabilities arranged in descending order. For example, it is assumed that four event fields (that is, M=4) are preset in the terminal: an event field 1, an event field 2, an event field 3, and an event field 4, and N=3. A field probability that the text information belongs to the event field 1 is 50%, a field probability that the text information belongs to the event field 2 is 25%, a field probability that the text information belongs to the event field 3 is 10%, and a field probability that the text information belongs to the event field 4 is 15%. Because 50%>25%>15%>10%, the terminal may select the first three event fields, namely, the event field 1, the event field 2, and the event field 4, from the event field 1 to the event field 4 that are arranged in descending order of the field probabilities.

In this way, when the terminal performs S403 to S405, the terminal needs to calculate only the prior probabilities and the confidence that the text information belongs to the N event fields, and does not need to calculate prior probabilities or confidence that the text information belongs to all of the M event fields. This can reduce a calculation amount when the terminal processes the voice information, and improve calculation efficiency.

Certainly, S402' in this embodiment of this application is optional, and the terminal may not perform S402'. In this case, the N event fields in this embodiment of this application are the M event fields, and N=M.

In this application, regardless of whether N is equal to M or N is less than M, after S402 or S402', the method in this application may include S403 to S406.

S403. The terminal obtains a prior probability that the text information belongs to each of the N event fields, where the prior probability is used to represent a probability, determined based on a plurality of times of semantic understanding that have been performed, that the text information belongs to an event field, the N event fields are N of the M event fields, and N is less than or equal to M.

A prior probability of an event field is used to represent a probability, determined based on a plurality of times of semantic understanding that have been performed, that the text information belongs to the event field. The terminal may obtain, based on historical data of a plurality of times of semantic understanding that have been performed, the prior probability that the text information belongs to each of the N event fields.

For example, in this application, a method for obtaining, by the terminal, the prior probability that the text information belongs to each of the N event fields is described by using an example in which the terminal obtains a prior probability that the text information belongs to a first event field in the N event fields. The first event field may be any one of the N event fields.

In a possible implementation, the terminal may collect statistics on a total quantity X of times of semantic understanding performed by the terminal, collect statistics on a quantity y of semantic understanding results that indicate that an event executed by the terminal belongs to the first event field in the X times of semantic understanding, and calculate a ratio y/X of the quantity y of the semantic understanding results to the total quantity X of times of semantic understanding, where y/X is the prior probability of the first event field. The total quantity X of times of semantic understanding that is obtained by the terminal through statistics collection is a total quantity of all times of semantic understanding that have been performed by the terminal. "All times of semantic understanding" herein do not limit objects on which the semantic understanding is performed, that is, include semantic understanding performed by the terminal on any text information.

For example, it is assumed that three event fields, for example, the music field, the setting field, and the app field, are preset in the terminal. A total quantity of times of semantic understanding performed by the terminal is P (that is, X=P). In the P times of semantic understanding, a semantic understanding results indicate that an event executed by the terminal belongs to the music field (simply referred to as semantic understanding of the music field), b semantic understanding results indicate that the event executed by the terminal belongs to the setting field (simply referred to as semantic understanding of the setting field), c semantic understanding results indicate that the event executed by the terminal belongs to the app field (simply referred to as semantic understanding of the app field), and a+b+c=P. Then, the terminal may determine that a prior probability that to-be-processed text information (for example, text information K) belongs to the music field is a/P, a prior probability that the text information K belongs to the setting field is b/P, and a prior probability that the text information K belongs to the app field is c/P.

Generally, there is a relatively high possibility that objects (that is, text information) corresponding to two consecutive times of semantic understanding performed by the terminal belongs to a same event field, or an event field to which an object corresponding to current semantic understanding belongs may affect an event field to which an object corresponding to next semantic understanding belongs. For example, in a scenario in which the user performs navigation by using a mobile phone, voice information that is input by the user and that is received by the mobile phone may be "navigation", and there is a relatively high possibility that subsequent voice information that is input by the user and that is received by the mobile phone is "go to No, 100, x street" or other location information. Both "navigation" and "go to No. 100, x street" may belong to the app field, and are used to instruct the mobile phone to invoke a map app to execute a corresponding event.

Based on the foregoing phenomenon, in a possible implementation, when the terminal obtains a prior probability that the text information K belongs to each of the N event fields, if an object corresponding to previous semantic understanding belongs to an event field A, the terminal may determine that a prior probability that the text information K belongs to the event field. A is a, where a>0.5, and determine that a prior probability that the text information K belongs to any other event field is (1−a)/(N−1).

For example, it is assumed that N=3, the N event fields include the music field, the setting field, and the app field, and the object corresponding to the previous semantic understanding belongs to the music field. The terminal may determine that a prior probability that the text information K belongs to the music field is 0.8, a prior probability that the text information K belongs to the setting field is (1−0.8)/(3−1)=0.1, and a prior probability that the text information K belongs to the app field is also 0.1.

Based on the foregoing phenomenon, in another possible implementation, the terminal may calculate, with reference to an event field (denoted as an event field Q) to which text information corresponding to previous semantic understanding performed by the terminal belongs, the prior probability that the text information K belongs to the first event field (for example, an event field P), then collect statistics on a probability that text information corresponding to two consecutive times of semantic understanding in all times of semantic understanding that have been performed by the terminal sequentially belongs to the event field Q and the event field P (that is, the event field Q is before the event field P chronologically), and determine the probability as the prior probability that the text information K belongs to the first event field (for example, the event field P).

Figure 5:
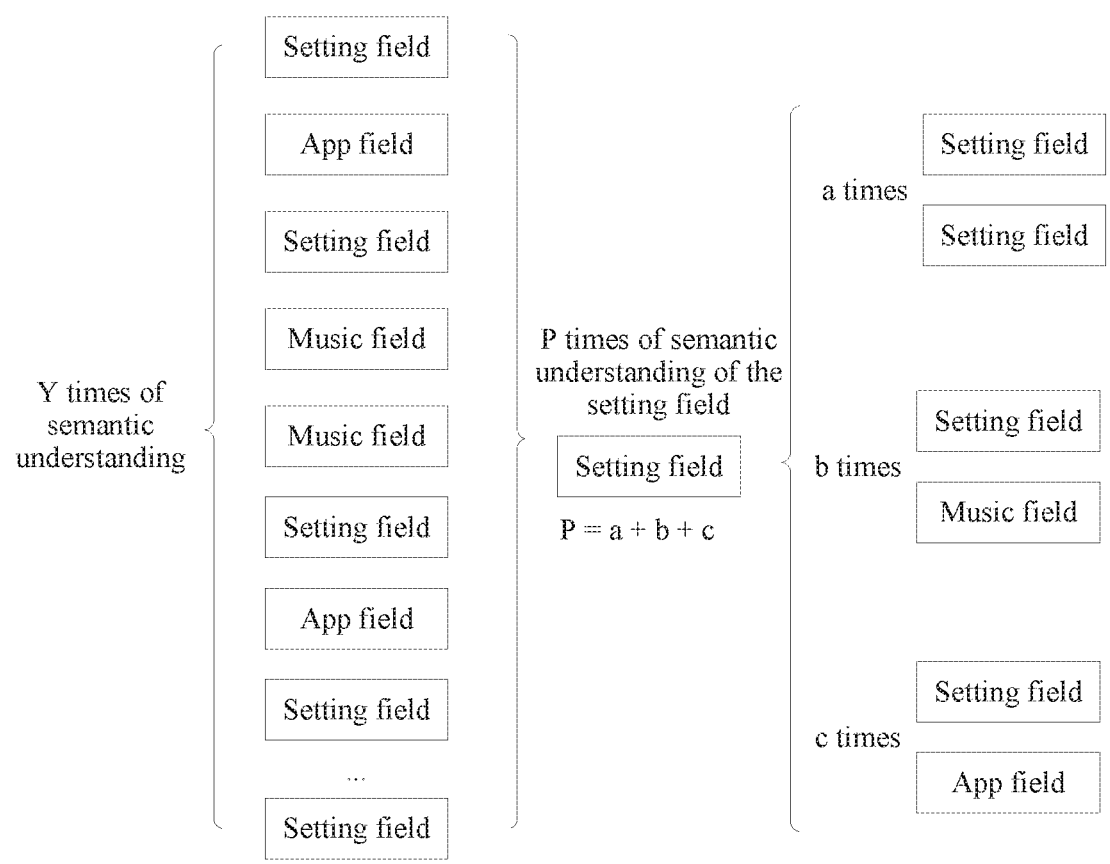
FIG. 5 is a schematic diagram of historical records of semantic understanding results in a voice information processing method according to an embodiment of this application.

For example, it is assumed that three event fields, for example, the music field, the setting field, and the app field, are preset in the terminal, and the terminal has performed Y times of semantic understanding in total. In addition, as shown in FIG. 5, semantic understanding results of the Y times of semantic understanding indicate that events executed by the terminal sequentially belong to the following event fields: the setting field, the app field, the setting field, the music field, the music field, the setting field, the app field, the setting field, . . . , and the setting field.

It is assumed that previous semantic understanding of current semantic understanding (the semantic understanding performed on the text information K) is semantic understanding of the setting, field. As shown in FIG. 5, the terminal obtains, through statistics collection, that a quantity of times of semantic understanding of the setting field in the Y times of semantic understanding is P. The terminal obtains an event field corresponding to next semantic understanding of each of the P times of semantic understanding of the setting field; and obtains, through statistics collection, that a quantity of times of semantic understanding whose previous semantic understanding corresponds to the setting field and whose next semantic understanding corresponds to the setting field is a, a quantity of times of semantic understanding whose previous semantic understanding corresponds to the setting field and whose next semantic understanding corresponds to the music field is b, and a quantity of times of semantic understanding whose previous semantic understanding corresponds to the setting field and whose next semantic understanding corresponds to the app field is c, where a+b+c=P. The terminal may determine that a prior probability that the text information K belongs to the setting field is a/P, a prior probability that the text information K belongs to the music field is b/P, and a prior probability that the text information K belongs to the app field is c/P. "Previous" and "next" in this embodiment means that, semantic understanding that is performed earlier is previous semantic understanding, and semantic understanding that is performed later is next semantic understanding.

It should be noted that in this embodiment of this application, the method for obtaining, by the terminal, the prior probability that the text information belongs to each of the N event fields includes but is not limited to the foregoing method; and another method for obtaining, by the terminal, the prior probability that the text information belongs to each event field is not described in this embodiment of this application.

S404. The terminal obtains confidence that the text information belongs to each of the N event fields, where the confidence is used to represent a certainty degree that the text information belongs to an event field.

Figure 6:
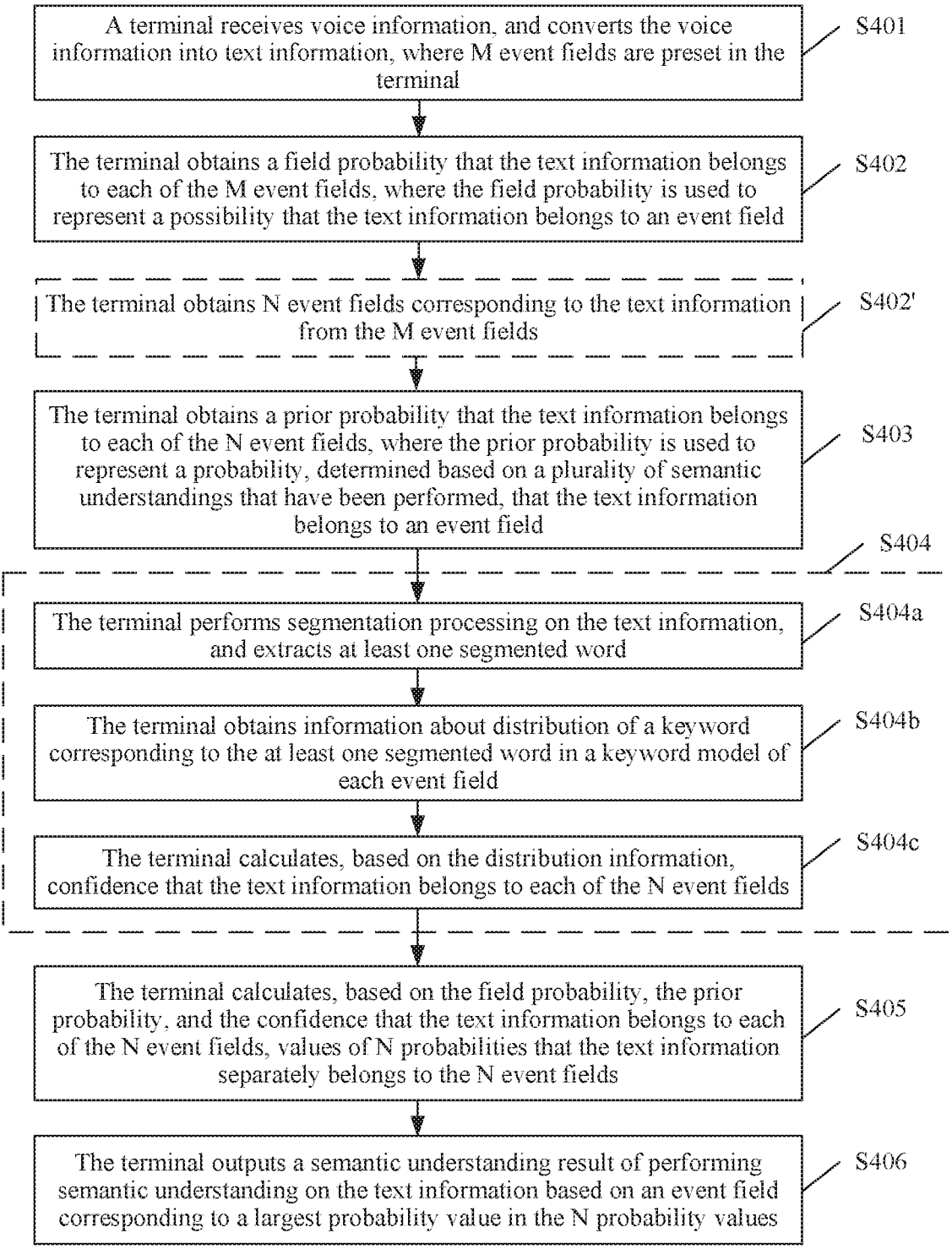
FIG. 6 is a third flowchart of a voice information processing method according to an embodiment of this application.

In this embodiment of this application, the terminal may store one keyword model for each of the NI event fields, where the keyword model of each event field includes a plurality of keywords of the event field, and the plurality of keywords are terms, short sentences, and the like commonly used in the event field. The terminal may perform word segmentation on the text information, extract at least one segmented word, and then calculate, based on a distribution status of a keyword corresponding to the at least one segmented word in the keyword models of the plurality of event fields, confidence that the text information belongs to each of the plurality of preset event fields. Specifically, as shown in FIG. 6, S404 shown in FIG. 4 may include S404a to S404c.

S404a. The terminal performs segmentation processing on the text information, and extracts at least one segmented word.

The terminal may invoke the algorithm layer 203 by using the field recognition module 2011 at the central control layer 201 in FIG. 2, to perform segmentation processing on the text information, and extract the at least one segmented word. For example, it is assumed that the text information is "play song B of singer A". The terminal may perform segmentation processing on the text information, and extract the following segmented words: "play", "song B", and "singer A". It is assumed that the terminal receives text information "turn down the volume for me" in a process of playing the song of the singer A. The terminal may perform segmentation processing on the text information, and extract the following segmented words: "for", "me", "turn down", and "volume".

S404b. The terminal obtains information about distribution of a keyword corresponding to the at least one segmented word in the keyword model of each event field.

Figure 7:
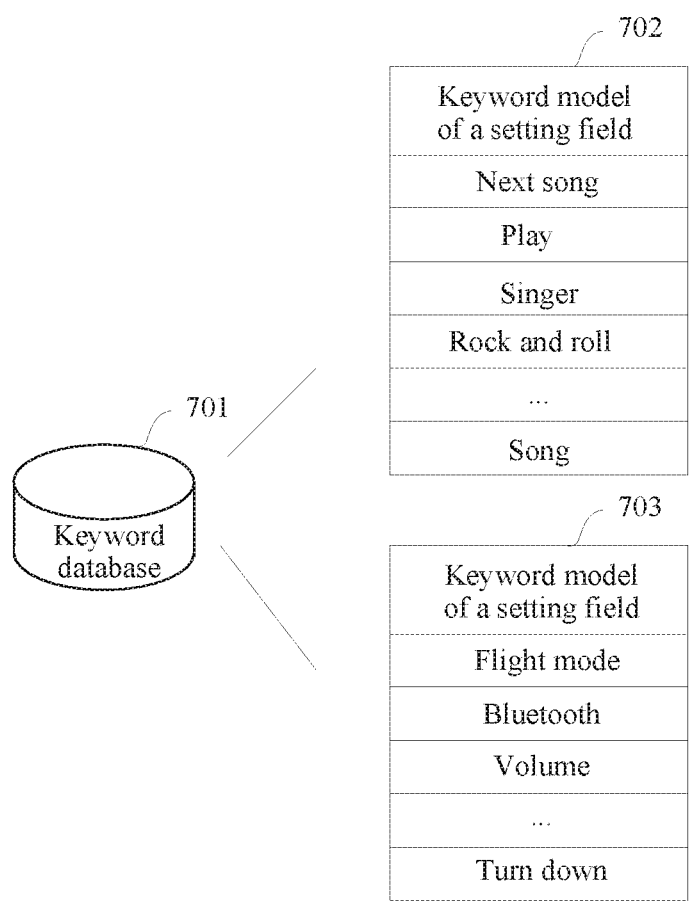
FIG. 7 is a first schematic diagram of an example of a keyword database according to an embodiment of this application.

For example, in this embodiment of this application, the terminal may maintain a keyword database 701 in FIG. 7, and the keyword database 701 may include the keyword models of the plurality of event fields. It is assumed that two event fields are preset in the terminal, for example, the music field and the setting field. As shown in FIG. 7, the keyword database 701 includes a keyword model 702 of the music field and a keyword model 703 of the setting field. The keyword model 702 of the music field includes a plurality of keywords of the music field, for example, play, next song, play, singer, rock and roll, and song. The keyword model 703 of the setting field includes a plurality of keywords of the setting field, for example, flight mode, Bluetooth, brightness, volume, and turn down.

S404c. The terminal calculates, based on the distribution information, the confidence that the text information belongs to each of the N event fields.

Confidence that the text information belongs to the first event field is used to represent a certainty degree that the text information belongs to the first event field.

For example, it is assumed that text information 1 is "play song B of singer A". At least one segmented word extracted by the terminal is "play", "singer A", and "song B". The terminal may determine that a keyword "play" corresponding to the segmented word "play", a keyword "singer" corresponding to the segmented word "singer A", and a keyword "song" corresponding to the segmented word "song B" are all included in the keyword model 702 of the music field. In other words, the terminal may determine that the keywords corresponding to all segmented words of the text information 1 are distributed in the keyword model 702 of the music field. In this case, the terminal may determine that confidence that the text information 1 belongs to the music field is 90%, and confidence that the text information 1 belongs to the setting field is 10%.

For another example, it is assumed that three event fields, for example, the music field, the setting field, and the app field, are preset in the terminal. The terminal performs segmentation processing on text information 2, and obtains at least one segmented word. When a keyword corresponding to the at least one segmented word is distributed in the keyword model of the setting field, the terminal may determine that confidence that the text information 2 belongs to the setting field is 80%, confidence that the text information 2 belongs to the music field is 10%, and confidence that the text information 2 belongs to the app field is 10%.

For still another example, it is assumed that three event fields, for example, the music field, the setting field, and the app field, are preset in the terminal. The terminal performs segmentation processing on text information 3, and obtains eight segmented words. When keywords corresponding to five of the eight segmented words are distributed in the keyword model of the setting field, keywords corresponding to two segmented words are distributed in the keyword model of the music field, and a keyword corresponding to one segmented word is distributed in the keyword model of the app field, the terminal may determine that confidence that the text information 3 belongs to the setting field is $5/8=62.5\%$, confidence that the text information 3 belongs to the music field is 25%, and confidence that the text information 3 belongs to the app field is 12.5%.

It should be noted that when M=N, a sequence of performing, by the terminal, S402, S403, and S404 is not limited in this embodiment of this application. For example, the terminal may first perform S403, then perform S404, and finally perform S402, or the terminal may first perform S404, then perform S402, and finally perform S404, or the terminal may perform S402, S403, and S404 approximately at the same time.

When N<M, after S402, the method in this application may further include S402'. In this case, the terminal may first perform S402, then perform S402', and finally perform S403 and S404. A sequence of performing, by the terminal, S403 and S404 is not limited in this embodiment of this application. For example, the terminal may first perform S403, and then perform S404, or the terminal may first perform S404, and then perform S403, or the terminal may perform S403 and S404 approximately at the same time.

S405. The terminal calculates, based on the field probability, the prior probability, and the confidence that the text information belongs to each of the N event fields, values of N probabilities that the text information separately belongs to the N event fields.

The terminal may calculate a product of a prior probability, a field probability, and confidence that the text information belongs to the first event field, and determine the calculated product as a value of a probability that the text information belongs to the first event field.

Figure 8:
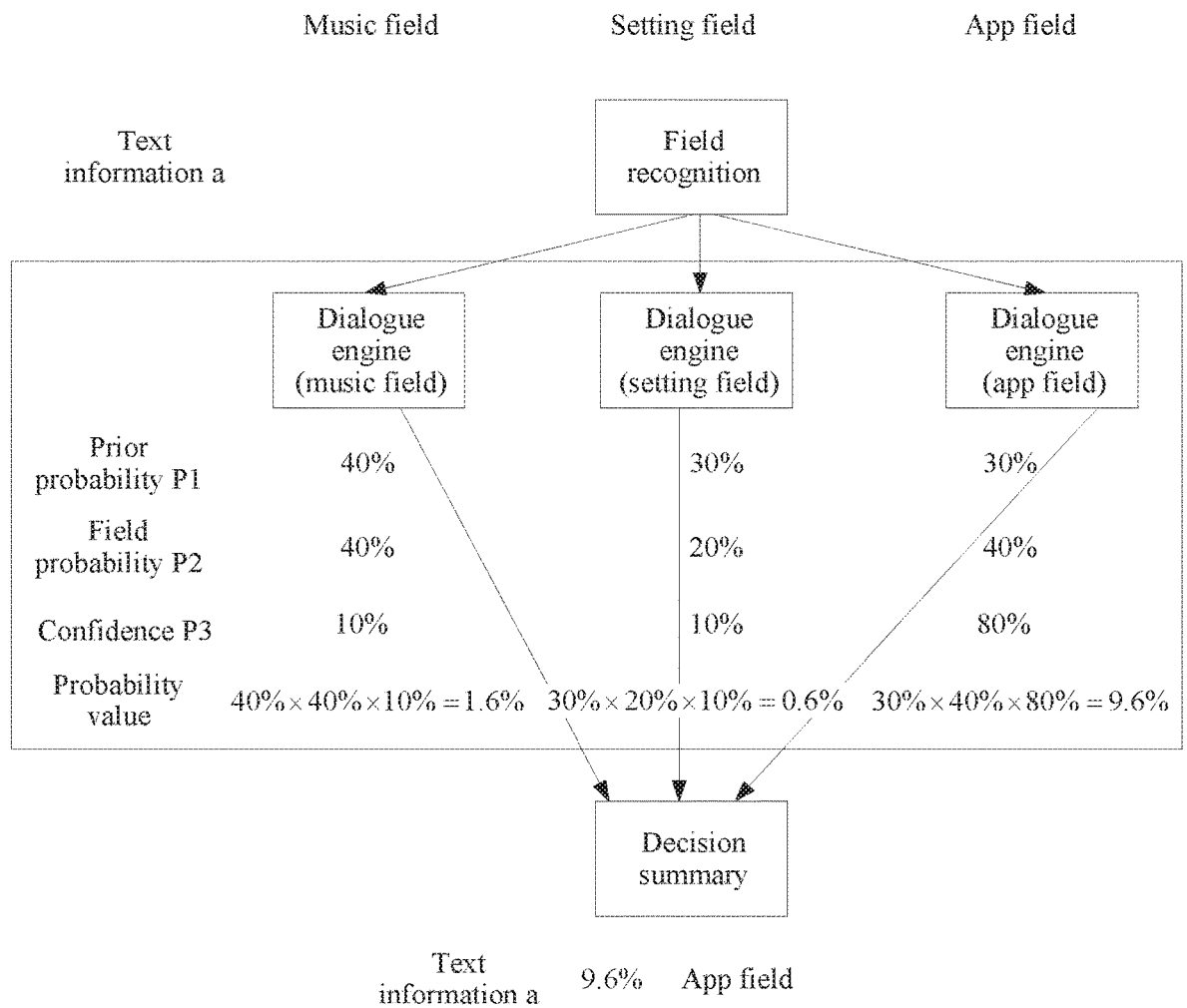
FIG. 8 is a first schematic diagram of an example of a process of performing a voice information processing method according to an embodiment of this application.

For example, as shown in FIG. 8, it is assumed that a prior probability that text information a belongs to the music field is 40%, a prior probability that the text information a belongs to the setting field is 30%; and a prior probability that the text information a belongs to the app field is 30%; a field probability that the text information a belongs to the music field is 40%, a field probability that the text information a belongs to the setting field is 20%, and a field probability that the text information a belongs to the app field is 40%; confidence that the text information a belongs to the music field is 10%, confidence that the text information a belongs to the setting field is 10%, and confidence that the text information a belongs to the app field is 80%. The terminal may obtain, through calculation, that a value of a probability that the text information a belongs to the music field is $40\%\times40\%\times10\%=1.6\%$, a value of a probability that the text information a belongs to the setting field is $30\%\times20\%\times10\%=0.6\%$, and a value of a probability that the text information a belongs to the app field is $30\%\times40\%\times80\%=96\%$.

S406. The terminal outputs a semantic understanding result of performing semantic understanding on the text information based on an event field corresponding to a largest probability value in the N probability values.

Optionally, S406 may be replaced with: using, by the terminal as a final semantic understanding result, a semantic understanding result of performing semantic understanding on the text information based on an event field corresponding to a largest probability value in the N probability values.

After step 402 to step 405 are performed for each event field corresponding to the text information, a value of a probability that the text information belongs to each event field may be obtained, that is, a plurality of probability values are obtained. Then, the terminal obtains the event field corresponding to the largest probability value, that is, identifies the event field corresponding to the largest probability value as an event field corresponding to the text information. After recognizing a field of the text information, the terminal may transmit the text information to a dialogue engine of the recognized event field, and the dialogue engine performs semantic understanding on the text information, to obtain a semantic understanding result. Alternatively, a sequence of performing, by the terminal, field recognition and semantic understanding may not be limited in this embodiment, and field recognition and semantic understanding may be performed at the same time or approximately at the same time, or field recognition may be performed after semantic understanding.

As shown in FIG. 8, each of a dialogue engine of the music field, a dialogue engine of the setting field, and a dialogue engine of the app field may perform semantic understanding on the text information a, to obtain a semantic understanding result. After field recognition, that is, after it is learned that the value 9.6% of the probability that the text information a belongs to the app field is greater than the value 1.6% of the probability that the text information a belongs to the music field, and the value 9.6% of the probability that the text information a belongs to the app field is greater than the value 0.6% of the probability that the text information a belongs to the setting field, the terminal may output the semantic understanding result of performing, by the dialogue engine of the app field, the semantic understanding on the text information a.

For example, after S402 and before S406, the terminal may perform semantic understanding on the text information in the N event fields, to obtain N semantic understanding results. Specifically, after S402 and before S406, the method in this embodiment of this application may further include S406'.

S406'. The terminal separately performs semantic understanding on the text information in the N event fields, to obtain N semantic understanding results.

For a method for performing, by the terminal, semantic understanding on the text information in each of the N event fields, to obtain the N semantic understanding results, refer to related descriptions in the foregoing embodiment of this application, and details are not described in this embodiment of this application again.

Further, after outputting the semantic understanding result, the terminal may further perform, based on the semantic understanding result, an operation corresponding to the semantic understanding result. Specifically, after S406, the method in this embodiment of this application may further include S407.

S407. After the terminal outputs the semantic understanding result, the terminal performs, based on the semantic understanding result, an operation corresponding to the semantic understanding result.

It should be noted that in this embodiment, the terminal uses, as the finally recognized semantic understanding result, the semantic understanding result of performing the semantic understanding on the text information based on the event field corresponding to the largest probability value. After determining the final semantic understanding result, the terminal may output the final result to the inside of the terminal, so that the terminal performs the operation corresponding to the final result. It may be understood that outputting the final result to the inside of the terminal may be a process of determining, by the terminal, a final result corresponding to the largest probability value, or may be a process in which the terminal sends the final result to another component (hardware or software) inside the terminal, so that the terminal performs the operation corresponding to the final result. Optionally, after determining the final semantic understanding result, the terminal may output the final semantic understanding result to the outside of the terminal. For example, the terminal may send the final result to another terminal, so that the another terminal obtains the final result, or the another terminal performs an action corresponding to the final result. Optionally, the terminal may not only perform the operation corresponding to the final result, but also output the final result to the outside.

In the voice information processing method provided in this embodiment of this application, after the voice information is converted into the text information, the prior probability that the text information belongs to each event field may be obtained based on historical data of performing, by the terminal, the semantic understanding; the text information may be analyzed, and the field probability that the text information belongs to each event field may be obtained; in addition, the terminal may calculate the confidence that the text information belongs to each event field; then, the terminal may calculate, based on a prior probability, a field probability, and confidence that the text information belongs to an event field, a value of a probability that the text information belongs to the event field; finally, the terminal may use, as the semantic understanding result of the text information (that is, the voice information), a semantic understanding result of performing, by a dialogue engine of the event field corresponding to the largest probability value, semantic understanding on the text information.

The prior probability that the text information belongs to an event field is used to represent a probability that the text information belongs to the event field in historical data, the field probability that the text information belongs to an event field is used to represent a possibility that the text information belongs to the event field, and the confidence that the text information belongs to an event field is used to represent a certainty degree that the text information belongs to the event field. In this embodiment of this application, an event field used to process the text information is selected with reference not only to a field probability obtained by analyzing a vocabulary included in the text information, but also to a prior probability that the text information belongs to the event field and confidence that the text information belongs to the event field. Therefore, accuracy of the selected event field can be improved, and accuracy of a semantic understanding result can be improved, thereby improving conformity between an event executed by the terminal and an event that the voice information input by the user instructs the terminal to execute, and improving user experience.

Figure 9:
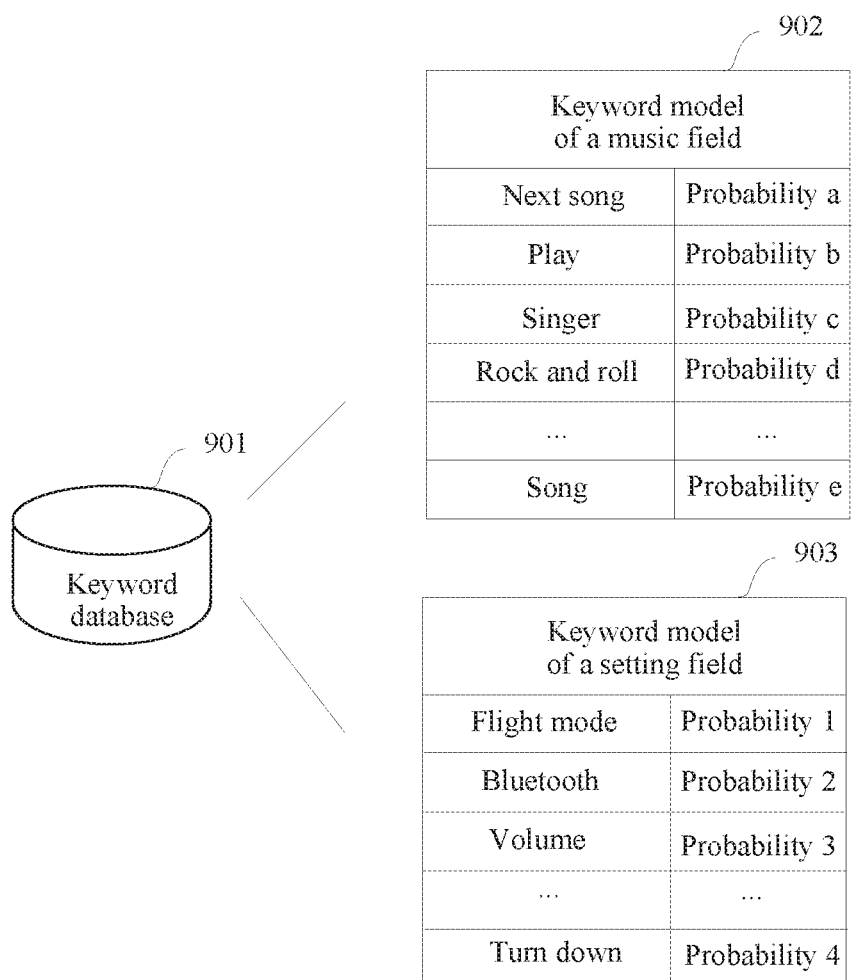
FIG. 9 is a second schematic diagram of an example of a keyword database according to an embodiment of this application.

Optionally, in a possible implementation, the keyword model not only may include a plurality of keywords, but also may include a probability, indicated by each keyword, that text information belongs to a corresponding event field. For example, as shown in FIG. 9, a keyword database 901 includes a keyword model 902 of a music field and a keyword model 903 of a setting field. The keyword model 902 of the music field may further include a probability "probability a", indicated by a keyword "next song", that the text information belongs to the music field, a probability "probability b", indicated by a keyword "play", that the text information belongs to the music field, a probability "probability c", indicated by a keyword "singer", that the text information belongs to the music field, a probability "probability d", indicated by a keyword "play", that the text information belongs to the music field, and a probability "probability e", indicated by a keyword "song", that the text information belongs to the music field. The keyword model 903 of the setting field may further include: a probability "probability 1", indicated by a keyword "flight mode", that the text information belongs to the setting field, a probability "probability 2", indicated by a keyword "Bluetooth", that the text information belongs to the setting field, a probability "probability 3", indicated by a keyword "volume", that the text information belongs to the setting field, a probability "probability 4", indicated by a keyword "turn down", that the text information belongs to the setting field, and the like.

It may be figured out that in this embodiment of this application, keyword databases such as the keyword database 701 and the keyword database 901 may be stored in the terminal. Alternatively, to reduce terminal memory occupation of the keyword databases, the keyword databases may be stored in a cloud server, and the terminal may search the keyword databases stored in the cloud server for a corresponding keyword and a probability indicated by the keyword.

Figure 10:
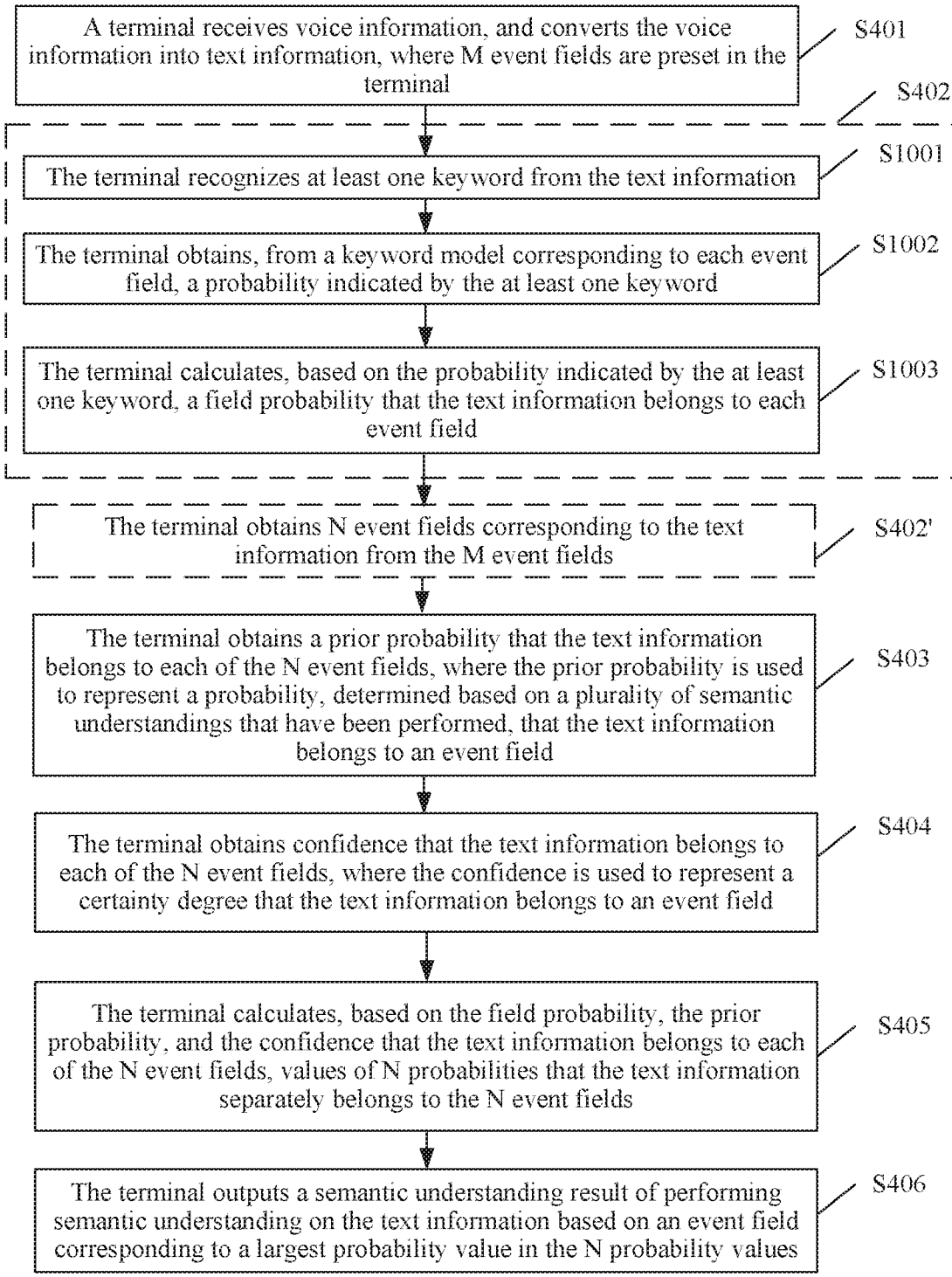
FIG. 10 is a fourth flowchart of a voice information processing method according to an embodiment of this application.

The terminal may recognize at least one keyword from the text information, and then calculate, based on a probability indicated by the at least one keyword, the field probability that the text information belongs to each event field. Specifically, S402 may include S1001 to S1003. For example, as shown in FIG. 10, S402 in FIG. 4 may be replaced with S1001 to S1003.

S1001. The terminal recognizes at least one keyword from the text information.

For each event field, the terminal may recognize whether the text information includes a keyword in a keyword model of the event field. For example, it is assumed that two event fields such as the music field and the setting field are preset in the terminal, and text information 4 is "when a next song is played, turn down the volume of the song". The terminal may recognize that the text information 4 includes keywords, "play", "next song", "turn down", "song", and "volume". "Play", "next song", and "song" are keywords in a keyword model of the music field, and "turn down" and "volume" are keywords in a keyword model of the setting field.

S1002. The terminal obtains, from a keyword model corresponding to each event field, a probability indicated by the at least one keyword.

For example, as shown in FIG. 9, the probability, indicated by the keyword. "play", that the text information belongs to the music field is the probability b, the probability, indicated by the keyword "next song", that the text information belongs to the music field is the probability a, and the probability, indicated by the keyword "song", that the text information belongs to the music field is the probability e. As shown in FIG. 9, the probability, indicated by the keyword "turn down", that the text information belongs to the setting field is the probability 4, and the probability, indicated by the keyword "volume", that the text information belongs to the setting field is the probability 3.

S1003. The terminal calculates, based on the probability indicated by the at least one keyword, the field probability that the text information belongs to each event field.

For example, a field probability that the text information 4 belongs to the music field may be a sum of the probability b, the probability a, and the probability e, and a field probability that the text information 4 belongs to the setting field may be a sum of the probability 4 and the probability 3.

Optionally, in this embodiment of this application, the terminal may further normalize the probability indicated by the at least one keyword, to calculate the field probability that the text information belongs to each event field. For example, the field probability that the text information 4 belongs to the music field may be (the probability b+the probability a+the probability e)/3, and the field probability that the text information 4 belongs to the setting field may be (the probability 4+the probability 3)/2.

In this embodiment of this application, the terminal may recognize the at least one keyword from the text information, and then calculate, based on the probability indicated by the at least one keyword, the field probability that the text information belongs to each event field. Because the at least one keyword may include keywords in the keyword models of the event fields, and the keywords may indicate, in the keyword models of different event fields, probabilities that the text information belongs to the corresponding event fields, the field probability that the text information belongs to each event field may be calculated based on the probability indicated by the keyword that is of each event field and that is included in the text information.

Figure 11:
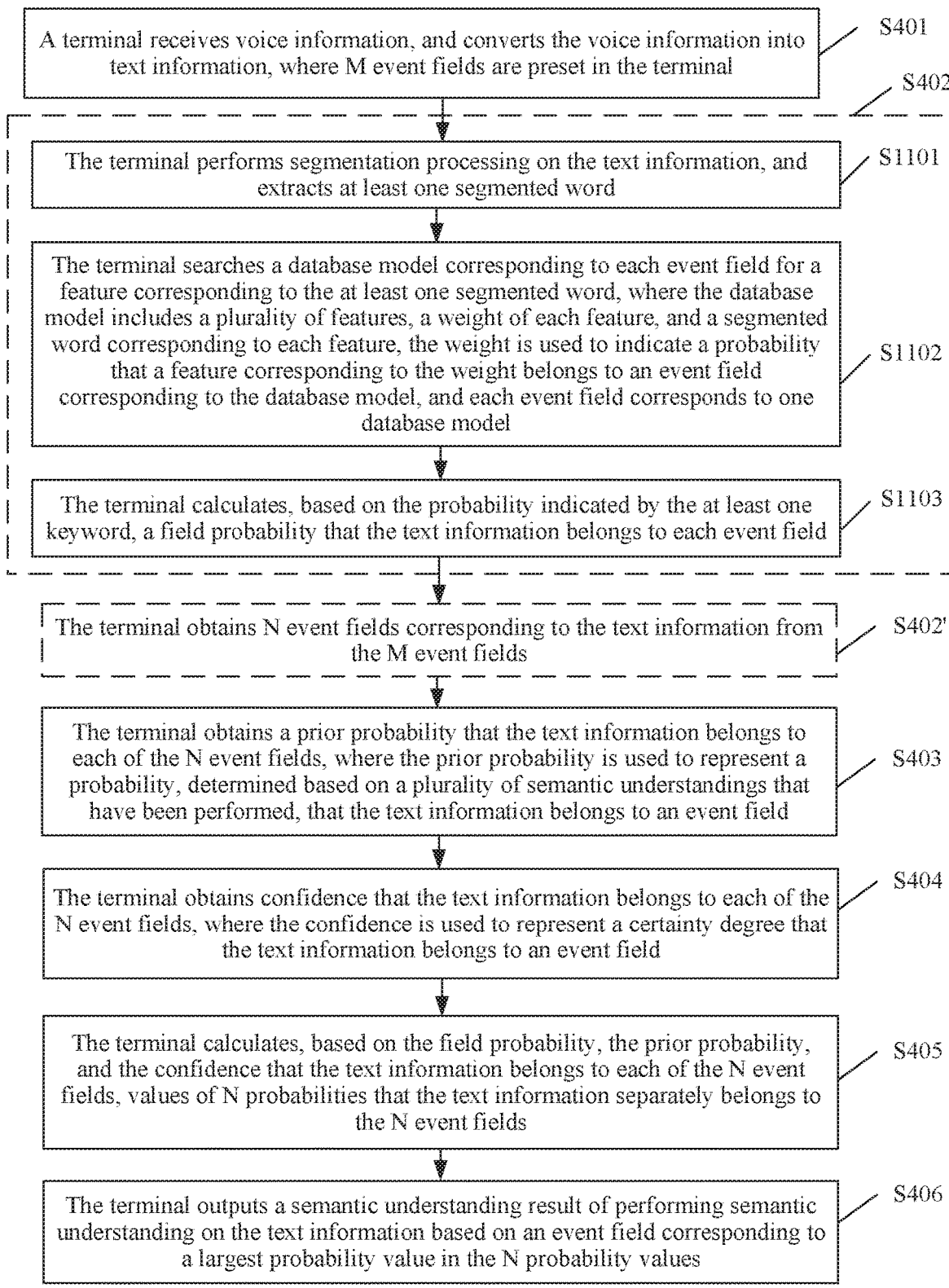
FIG. 11 is a fifth flowchart of a voice information processing method according to an embodiment of this application.

Optionally, in another possible implementation, the terminal may maintain a feature database, and the feature database includes database models of the plurality of event fields. Each database model includes a plurality of features, a weight of each feature, and a segmented word corresponding to each feature, and the weight of the feature is used to indicate a probability that the corresponding feature belongs to a corresponding event field. The terminal may perform the following operations for any event field, to calculate a field probability that the text information belongs to the event field: performing segmentation processing on the text information, and extracting at least one segmented word; then searching a database model of the event field for a feature corresponding to the at least one segmented word; and then calculating, based on a weight of the found feature, the field probability that the text information belongs to the event field. Specifically, S402 may include S1101 to S1103. For example, as shown in FIG. 11, S402 in FIG. 4 may be replaced with S1101 to S1103.

S1101. The terminal performs segmentation processing on the text information, and extracts at least one segmented word.

For a method for performing, by the terminal, segmentation processing on the text information and extracting the at least one segmented word, refer to detailed descriptions in S404a in the foregoing embodiment, and details are not described in this embodiment of this application again.

S1102. The terminal searches a database model corresponding to each event field for a feature corresponding to the at least one segmented word, where the database model includes a plurality of features, a weight of each feature, and a segmented word corresponding to each feature, the weight is used to indicate a probability that a feature corresponding to the weight belongs to an event field corresponding to the database model, and each event field corresponds to one database model.

The terminal may collect statistics on a plurality of segmented words appearing in each event field, and then allocate, to each segmented word, a feature that can uniquely identify the segmented word. For example, the terminal may allocate, to each segmented word, a number that can uniquely identify the segmented word, where the number may be a decimal number, or may be a binary number, or the number may be a number in another format. A format of the number is not limited in this embodiment of this application. Then, the terminal may determine, based on a value of a probability that each segmented word belongs to each event field in historical semantic understanding results, a probability that a feature corresponding to each segmented word belongs to each event field.

Figure 12:
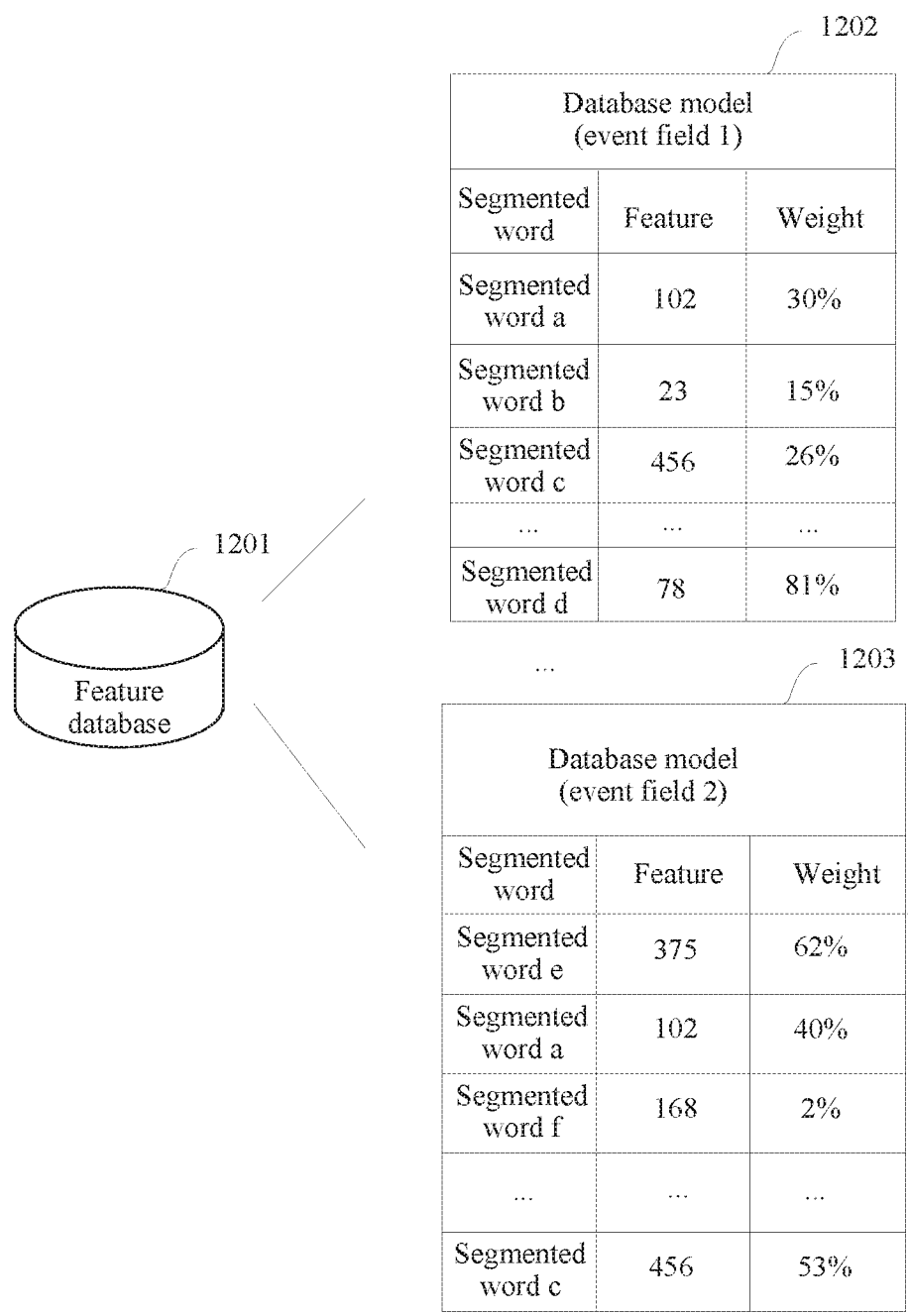
FIG. 12 is a first schematic diagram of an example of a feature database according to an embodiment of this application.

For example, as shown in FIG. 12, the terminal may maintain a feature database 1201, and the feature database 1201 includes a database model 1202 of an event field 1, a database model 1203 of an event field 2, and the like. The database model 1202 of the event field 1 includes a feature 102, a segmented word a corresponding to the feature 102, and a weight 30% of the feature 102 in the event field a feature 23, a segmented word b corresponding to the feature 23, and a weight 15% of the feature 23 in the event field 1; a feature 456, a segmented word c corresponding to the feature 456, and a weight 26% of the feature 456 in the event field 1; and a feature 78, a segmented word d corresponding to the feature 78, and a weight 81% of the feature 78 in the event field 1. The database model 1203 of the event field 2 includes a feature 375, a segmented word e corresponding to the feature 375, and a weight 62% of the feature 375 in the event field 2; a feature 102, a segmented word a corresponding to the feature 102, and a weight 40% of the feature 102 in the event field 2; a feature 168, a segmented word f corresponding to the feature 268, and a weight 2% of the feature 168 in the event field 2; and a feature 456, a segmented word c corresponding to the feature 456, and a weight 53% of the feature 456 in the event field 2.

It should be noted that in the feature database, a same segmented word has a same feature in database models of different event fields; in other words, a feature of a segmented word can uniquely identify the segmented word in the feature database. However, a same segmented word has different weights in different event fields.

For example, as shown in FIG. 12, in both the database model 1202 of the event field 1 and the database model 1203 of the event field 2, features of the segmented word a are 102, features of the segmented word c are 456, a weight of the feature 102 in the event field 1 is 20%, a weight of the feature 102 in the event field 2 is 40%, a weight of the feature 456 in the event field 1 is 26%, and a weight of the feature 456 in the event field 2 is 53%.

For example, that the text information is "turn on blue light to emit a little bit less radiation to the eyes" is used as an example. The terminal performs segmentation processing on the text information, and may obtain the following segmented words: "turn on", "blue light", "to emit", "eyes", "to", "radiation", "less", and "a little bit". It is assumed that a feature of the segmented word "turn on" is 5545, a feature of the segmented word "blue light" is 2313, a feature of the segmented word "to emit" is 2212, a feature of the segmented word "eyes" is 9807, a feature of the segmented word "to" is 44, a feature of the segmented word "radiation" is 3566, a feature of the segmented word "less" is 4324, a feature of the segmented word "a little bit" is 333. The terminal may determine that a feature model of the text information "turn on blue light to emit a little bit less radiation to the eyes" is 5545, 2313, 2212, 9807, 44, 3566, 4324, and 333.

S1103. The terminal calculates, based on the weight of the feature found in the database model corresponding to each event field, the field probability that the text information belongs to each event field.

The terminal may perform the following operations for each event field, to calculate the field probability of the corresponding event field: The terminal searches a database model of any event field for a weight of each feature in the feature model in the event field; and the terminal calculates a sum of the found weights. The sum of the weights that is obtained by the terminal through calculation is a field probability that the text information belongs to the event field.

For example, it is assumed that two event fields (for example, the music field and the setting field) are preset in the terminal. In the feature model "5545, 2313, 2212, 9807, 44, 3566, 4324, and 333", a weight of the feature 5545 in the music field is 21%, and a weight of the feature 5545 in the setting field is 79%; a weight of the feature 2313 in the music field is 12%, and a weight of the feature 5545 in the setting field is 88%; a weight of the feature 2212 in the music field is 69%, and a weight of the feature 5545 in the setting field is 31%; a weight of the feature 9807 in the music field is 56%, and a weight of the feature 5545 in the setting field is 44%; a weight of the feature 44 in the music field is 91%, and a weight of the feature 5545 in the setting field is 9%; a weight of the feature 3566 in the music field is 56%, and a weight of the feature 5545 in the setting field is 44%; a weight of the feature 4324 in the music field is 75%, and a weight of the feature 5545 in the setting field is 25%; and a weight of the feature 333 in the music field is 12%, and a weight of the feature 5545 in the setting field is 88%.

Then, the terminal may obtain, through calculation, that a field probability that the text information belongs to the music field is (21%+12%+69%+56%+23%+56%+75%+12%)/8=40.5%, and a field probability that the text information belongs to the setting field is (79%+88%+31%+44%+77%+44%+25%+88%)/8=59.5%.

Optionally, in another possible implementation, the terminal may maintain a feature database, and the feature database includes database models of the plurality of event fields and a feature relationship model. Each database model includes a plurality of features and a weight of each feature, and the weight of the feature is used to indicate a probability that the corresponding feature belongs to a corresponding event field. The feature relationship model includes a plurality of features and a segmented word corresponding to each feature.

Figure 13:
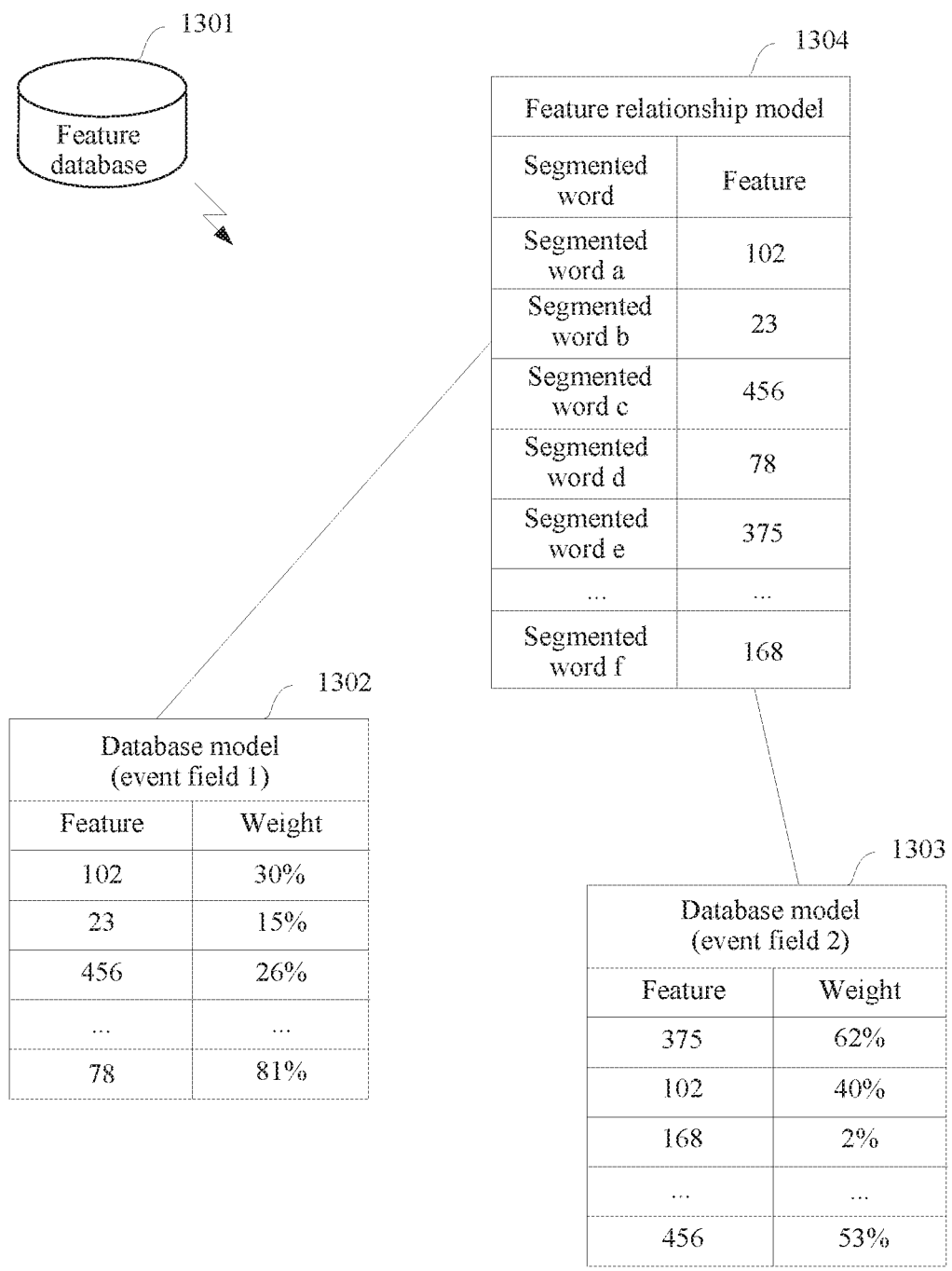
FIG. 13 is a second schematic diagram of an example of a feature database according to an embodiment of this application.

For example, as shown in FIG. 13, the terminal may maintain a feature database 1301, and the feature database 1201 includes a database model 1302 of an event field 1, a database model 1303 of an event field 2, and a feature relationship model 1304. The feature relationship model 1304 includes: a segmented word a and a feature 102 corresponding to the segmented word a; a segmented word b and a feature 23 corresponding to the segmented word b; a segmented word c and a feature 456 corresponding to the segmented word c; a segmented word d and a feature 78 corresponding to the segmented word d; a segmented word e and a feature 375 corresponding to the segmented word e; a segmented word f and a feature 168 corresponding to the segmented word f; and the like. The database model 1302 of the event field 1 includes: a feature 102 and a weight 30% of the feature 102 in the event field 1; a feature 23 and a weight 15% of the feature 23 in the event field 1; a feature 456 and a weight 26% of the feature 456 in the event field 1; and a feature 78 and a weight 81% of the feature 78 in the event field 1. The database model 1303 of the event field 2 includes: a feature 375 and a weight 62% of the feature 375 in the event field 2; a feature 102 and a weight 40% of the feature 102 in the event field 2; a feature 168 and a weight 2% of the feature 168 in the event field 2; and a feature 456 and a weight 53% of the feature 456 in the event field 2.

After performing S1102 to obtain the at least one segmented word, the terminal may first search the feature relationship model 1304 in FIG. 13 for a feature corresponding to the at least one segmented word; and determine a feature model of the text information; then search the database model 1302 of the event field 1 for a weight of the feature in the feature model in the event field 1, to calculate a field probability that the text information belongs to the event field 1; and search the database model 1303 of the event field 2 for a weight of the feature in the feature model in the event field 2, to calculate a field probability that the text information belongs to the event field 2.

It should be noted that when performing S404a to S404c to calculate the certainty degree that the text information belongs to each event field, the terminal performs operations of "performing segmentation processing on the text information and extracting the at least one segmented word", and when performing S1101 to S1103 to calculate the field probability that the text information belongs to each event field, the terminal also performs operations of "performing segmentation processing on the text information and extracting the at least one segmented word". To avoid the terminal from repeatedly performing the following operations of "performing segmentation processing on the text information and extracting the at least one segmented word", when performing S404a to S404c to calculate the certainty degree that the text information belongs to the first event field, and performing S1101 to S1103 to calculate the field probability that the text information belongs to the first event field, the terminal may perform only S404a and does not perform S1101, or the terminal may perform only S1101 and does not perform S404a.

The method provided in this embodiment of this application not only may be applied to a process of single-round voice dialogues between the terminal and the user, but also may be applied to a process of multi-round voice dialogues between the terminal and the user. In this embodiment of this application, the single-round voice dialogues mean that the user and the terminal make voice dialogues in a question-and-answer mode. However, in some scenarios, after the user input one piece of voice information (for example, voice information a) to the terminal, when the terminal replies to the user in response to the voice information a, the user inputs another piece of voice information (for example, voice information b). In this case, because the terminal receives the voice information a and the voice information b almost at the same time, the terminal needs to process the voice information a and the voice information b at the same time. For example, text information a corresponding to the voice information a is "I want to go to Tibet", and text information b corresponding to the voice information b is "how is the weather today".

In this embodiment of this application, a dialogue process in which the terminal receives and processes the voice information a and the voice information h is referred to as multi-round voice dialogues. In this embodiment of this application, the terminal may convert the voice information a and the voice information h into the text information, and perform semantic understanding on the text information a and the text information b.

Figure 14:
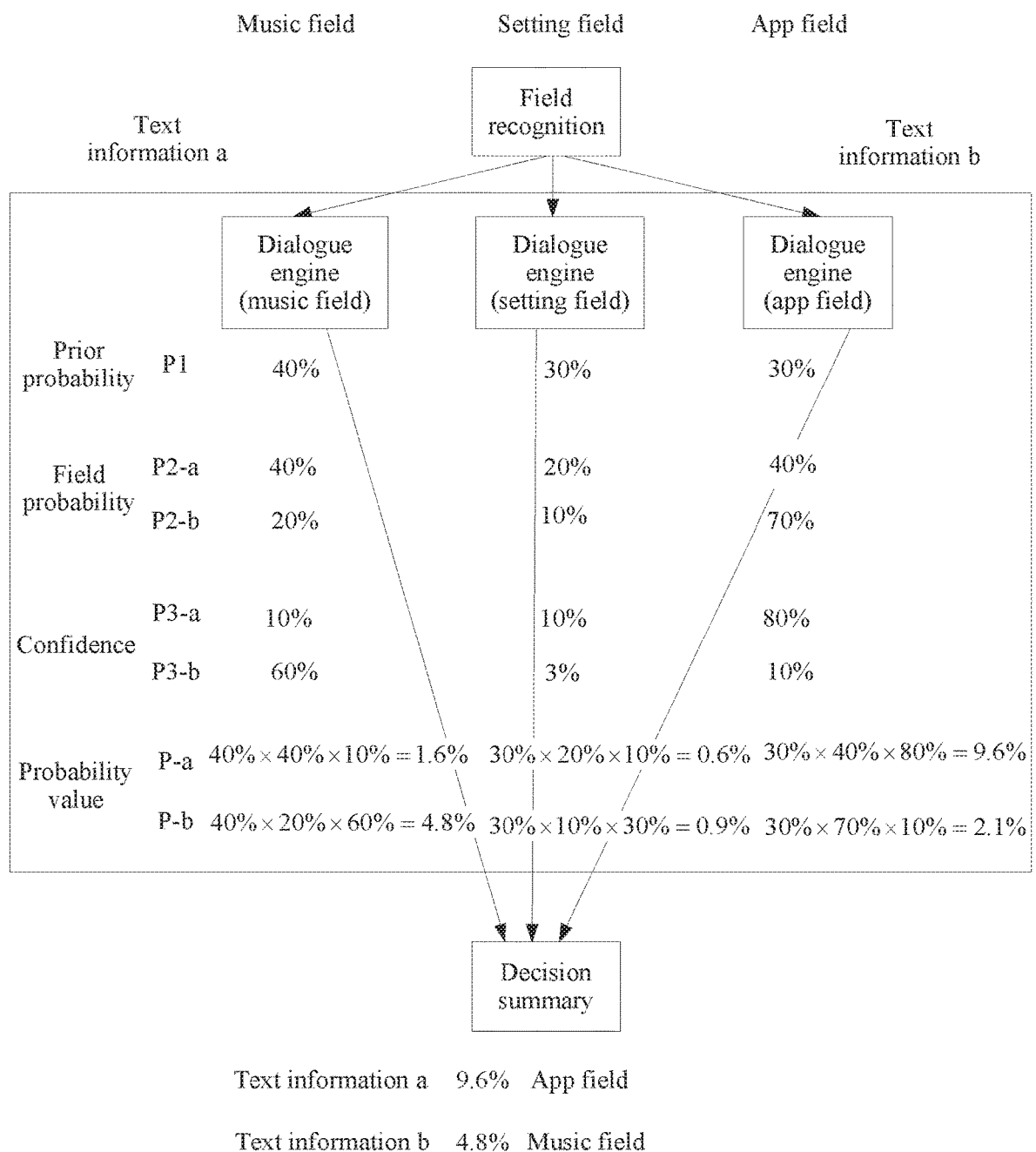
FIG. 14 is a second schematic diagram of an example of a process of performing a voice information processing method according to an embodiment of this application.

For example, when receiving the voice information b, the terminal possibly may not perform the semantic understanding on the text information a. Therefore, the terminal may consider that previous voice information of the voice information h is the same as previous voice information of the voice information a. Because a prior probability depends on an event field corresponding to previous voice information, a prior probability that the text information a belongs an event field is the same as a prior probability that the text information h belongs to the event field. For example, as shown in FIG. 14, both a prior probability P1 that the text information a belongs to the music field and a prior probability P1 that the text information b belongs to the music field are 40%, both a prior probability P1 that the text information a belongs to the setting field and a prior probability P1 that the text information b belongs to the setting field are 30%, and both a prior probability P1 that the text information a belongs to the app field and a prior probability P1 that the text information b belongs to the app field are 30%. Field probabilities and confidence of the text information a and the text information b may be calculated separately. A field probability P2-a that the text information a belongs to the music field is 40%, a field probability P2-a that the text information a belongs to the setting field is 20%, and a field probability P2-a that the text information a belongs to the app field is 40%. A field probability P2-b that the text information b belongs to the music field is 20%, a field probability P2-b that the text information b belongs to the setting field is 10%, and a field probability P2-b that the text information b belongs to the app field is 70%. Confidence P3-a that the text information a belongs to the music field is 10%, confidence P3-a that the text information a belongs to the setting field is 10%, and confidence P3-a that the text information a belongs to the app field is 80%. Confidence P3-b that the text information b belongs to the music field is 60%, confidence P3-b that the text information b belongs to the setting field is 30%, and confidence P3-b that the text information b belongs to the app field is 10%.

As shown in FIG. 14, the terminal may obtain through calculation at the same time or approximately at the same time that: a value P-a of a probability that the text information a belongs to the music field is 40%×40%×10%=1.6%, a value P-a of a probability that the text information a belongs to the setting field is 30%×20%×10%=0.6%, a value P-a of a probability that the text information a belongs to the app field is 30%×40%×80%=9.6%, a value P-b of a probability that the text information b belongs to the music field is 40%×20%×60%=4.8%, a value P-b of a probability that the text information h belongs to the setting field is 30%×10%×30%=0.9%, and a value P-b of a probability that the text information b belongs to the app field is 30%×70%×10%=2.1%.

As shown in FIG. 14, each of a dialogue engine of the music field, a dialogue engine of the setting field, and a dialogue engine of the app field may perform semantic understanding on each of the text information a and the text information b, to obtain semantic understanding results. Because the value 9.6% of the probability that the text information a belongs to the app field is greater than the value 1.6% of the probability that the text information a belongs to the music field, and is also greater than the value 0.6% of the probability that the text information a belongs to the setting field, the terminal may output a semantic understanding result of performing, by the dialogue engine of the app field, the semantic understanding on the text information a. Because the value 4.8% of the probability that the text information b belongs to the music field is greater than the value 2.1% of the probability that the text information b belongs to the app field, and is also greater than the value 0.9% of the probability that the text information b belongs to the setting field, the terminal may output a semantic understanding result of performing, by the dialogue engine of the music field, the semantic understanding on the text information b.

The voice information processing method provided in this embodiment of this application not only may be applied to a process of single-round voice dialogues between the terminal and the user, but also may be applied to a process of multi-round voice dialogues between the terminal and the user. Regardless of whether the method provided in this embodiment of this application is applied to a process of single-round voice dialogues between the terminal and the user or a process of multi-round voice dialogues between the terminal and the user, accuracy of a selected event field can be improved, and accuracy of a semantic understanding result can be improved, thereby improving conformity between an event executed by the terminal and an event that voice information input by the user instructs the terminal to execute, and improving user experience.

It may be understood that, to implement the foregoing functions, the terminal and the like include corresponding hardware structures anchor software modules for performing the functions. A person skilled in the art should easily be aware that units and algorithm steps in the examples described with reference to the embodiments disclosed in this specification can be implemented by hardware or a combination of hardware and computer software. Whether a function is executed by hardware or hardware driven by computer software depends on particular applications and design constraints of the technical solutions. A person skilled in the art may use different methods to implement the described functions for particular applications, but it should not be considered that the implementation goes beyond the scope of the embodiments of the present invention.

In the embodiments of this application, function modules of the terminal may be obtained through division based on the foregoing method examples. For example, function modules may be obtained through division in one-to-one correspondence with functions, or two or more functions may be integrated into one processing module. The integrated module may be implemented in a form of hardware, or may be implemented in a form of a software function module. It should be noted that in the embodiments of the present invention, module division is an example, and is merely a logical function division. In actual implementation, another division manner may be used.

Figure 15:
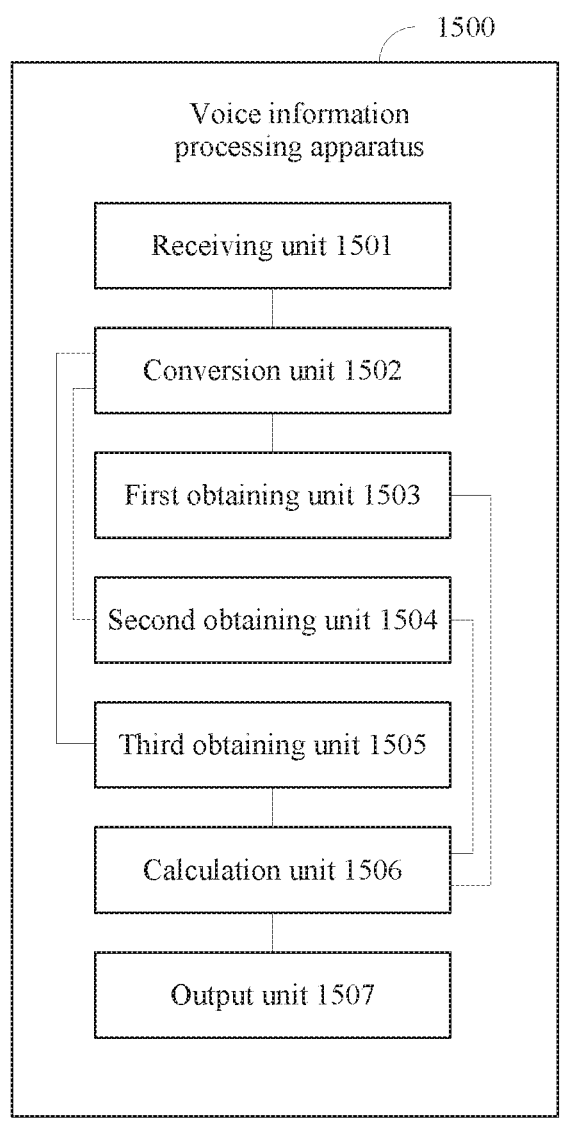
FIG. 15 is a first schematic structural composition diagram of a voice information processing apparatus according to an embodiment of this application.

When function modules are obtained through division in one-to-one correspondence with functions, FIG. 15 is a possible schematic structural diagram of a voice information processing apparatus in the terminal used in the foregoing embodiment. The voice information processing apparatus 1500 includes a receiving unit 1501, a conversion unit 1502, a first obtaining unit 1503, a second obtaining unit 1504, a third obtaining unit 1505, a calculation unit 1506, and an output unit 1507.

The receiving unit 1501 is configured to support the terminal in performing an operation of "receiving voice information" in S401 in the method embodiment, and/or another process of the technology described in this specification.

The conversion unit 1502 is configured to support the terminal in performing an operation of "converting the voice information into text information" in S401 in the method embodiment, and/or another process of the technology described in this specification.

The first obtaining unit 1503 is configured to support the terminal in performing S402, S1001 to S1003, and S1101 to S1103 in the method embodiment, and/or another process of the technology described in this specification.

The second obtaining unit 1504 is configured to support the terminal in performing S403 in the method embodiment, and/or another process of the technology described in this specification.

The third obtaining unit 1505 is configured to support the terminal in performing S404, and S404a to S404c in the method embodiment, and/or another process of the technology described in this specification.

The calculation unit 1506 is configured to support the terminal in performing S405 in the method embodiment, and/or another process of the technology described in this specification.

The output unit 1507 is configured to support the terminal in performing S406 in the method embodiment, and/or another process of the technology described in this specification.

Further, the voice information processing apparatus 1500 may further include a semantic understanding unit. The semantic understanding unit is configured to support the terminal in performing S406' in the method embodiment, and/or another process of the technology described in this specification.

Further, the voice information processing apparatus 1500 may further include a storage unit. The storage unit is configured to store information such as the keyword model and the database model in the method embodiment.

Further, the voice information processing apparatus 1500 may further include a performing unit. The performing unit is configured to support the terminal in performing S407 in the method embodiment, and/or another process of the technology described in this specification.

All related content of the steps in the foregoing method embodiment may be cited in function descriptions of corresponding function modules. Details are not described herein again.

Figure 16:
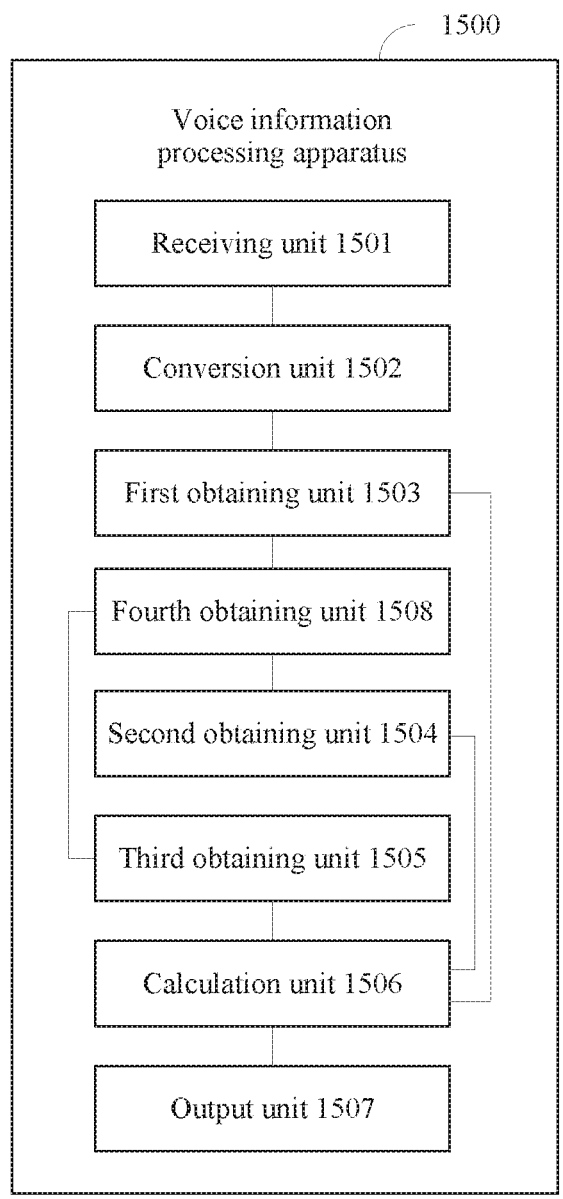
FIG. 16 is a second schematic structural composition diagram of a voice information processing apparatus according to an embodiment of this application.

Certainly, the voice information processing apparatus 1500 includes but is not limited to the units and modules listed above. For example, as shown in FIG. 16, the voice information processing apparatus 1500 may further include a fourth obtaining unit 1508. The fourth obtaining unit is configured to support the terminal in performing S402' in the method embodiment, and/or another process of the technology described in this specification.

In addition, functions that can be specifically implemented by the function units include but are not limited to the functions corresponding to the method steps described in the foregoing example. For detailed descriptions of other units of the voice information processing apparatus 1500, refer to the detailed descriptions of the corresponding method steps, and details are not described in this embodiment of this application again.

It should be noted that the semantic understanding unit may correspond to one or more dialogue engines at the dialogue engine layer 202 in FIG. 2. The conversion unit 1502 may correspond to the field recognition module 2012 in FIG. 2. Functions of the first obtaining unit 1503, the second obtaining unit 1504, the third obtaining unit 1505, and the calculation unit 1506 may be integrated into the DS module 2014 in FIG. 2 for implementation. It may be understood that the semantic understanding unit, the conversion unit 1502, the first obtaining unit 1503, the second obtaining unit 1504, the third obtaining unit 1505, the calculation unit 1506, and the like may be integrated into one processing module for implementation. The processing module may be a processor or a controller, for example, may be a central processing unit (Central Processing Unit, CPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module may implement or execute various example logical blocks, modules, and circuits in the examples described with reference to content disclosed in this application. Alternatively, the processor may be a combination for implementing a computing function, for example, a combination including one or more microprocessors, or a combination of a DSP and a microprocessor. The receiving unit 1501 and the output unit 1507 may correspond to the VSI 2011 in FIG. 2. The VSI 2011 may be an interface of a processor of the terminal. The storage unit may be a storage module configured to store an algorithm, a rule, and the like at the algorithm layer 203 in FIG. 2. The storage module may be a memory.

Figure 17:
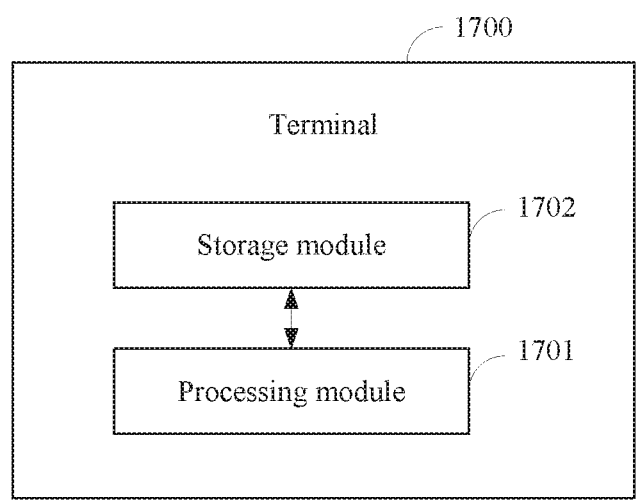
FIG. 17 is a schematic structural composition diagram of a terminal according to an embodiment of this application.

When an integrated unit is used, FIG. 17 is a possible schematic block diagram of the terminal used in the foregoing embodiment. The terminal 1700 includes a processing module 1701 and a storage module 1702. The storage module 1702 is configured to store program code and data (for example, an algorithm and a rule) of the terminal. The processing module 1701 is configured to execute the program code stored in the storage module 1702, to perform the voice information processing method in the method embodiment. Further, the terminal 1700 may further include a communications module 1703. The communications module 1703 is configured to support the terminal in communicating with another network entity. The communications module 1703 may be a transceiver, a transceiver circuit, a communications interface, or the like. The storage module 1702 may be a memory.

When the processing module 1701 is a processor (the processor 101 in FIG. 1), the communications module 1703 is an RF transceiver circuit (the radio frequency circuit 102 in FIG. 1), and the storage module 1702 is a memory (the memory 103 in FIG. 1), the terminal provided in this embodiment of the present invention may be the terminal 100 in FIG. 1. The communications module 1703 not only may include a radio frequency circuit, but also may include a Wi-Fi module and a Bluetooth module. The communications modules such as the radio frequency circuit, the Wi-Fi module, and the Bluetooth module may be collectively referred to as a communications interface. In this embodiment of this application, the terminal may include one or more processors and one or more memories. The one or more processors, the one or more memories, and the communications interface may be coupled together by using a bus.

An embodiment of this application further provides an electronic device. The electronic device includes the voice information processing apparatus 1500 that is described in the foregoing embodiment and that is configured to perform the voice information processing method in the foregoing embodiment.

An embodiment of this application further provides a computer storage medium. The computer storage medium stores computer program code. When the processor executes the computer program code, the electronic device performs related method steps in any one of FIG. 3, FIG. 4, FIG. 6, FIG. 10, and FIG. 11, to implement the voice information processing method in the foregoing embodiment.

An embodiment of this application further provides a computer program product. When the computer program product is run on an electronic device, the electronic device is enabled to perform related method steps in any one of FIG. 3, FIG. 4, FIG. 6, FIG. 10, and FIG. 11, to implement the voice information processing method in the foregoing embodiment.

The voice information processing apparatus 1500, the terminal 1700, the computer storage medium, or the computer program product provided in the embodiments of the present invention is configured to perform the corresponding method provided above. Therefore, for beneficial effects that can be achieved, refer to the beneficial effects of the corresponding method provided above, and details are not described herein again.

The foregoing descriptions of the implementations allow a person skilled in the art to clearly understand that, for ease and brevity of description, division of the foregoing function modules is used as an example for illustration. In actual application, the foregoing functions can be allocated to and implemented by different modules depending on a requirement, that is, an inner structure of the apparatus is divided into different function modules to implement all or some of the functions described above. For detailed working processes of the system, apparatus, and unit described above, refer to corresponding processes in the foregoing method embodiments, and details are not described herein again.

In the several embodiments provided in the embodiments of this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined, or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

The foregoing descriptions of the implementations allow a person skilled in the art to clearly understand that, for ease and brevity of description, division of the foregoing function modules is used as an example for illustration. In actual application, the foregoing functions can be allocated to and implemented by different modules depending on a requirement, that is, an inner structure of the apparatus is divided into different function modules to implement all or some of the functions described above. For detailed working processes of the system, apparatus, and unit described above, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined, or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium, Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A voice information processing method, implemented by a terminal, wherein the voice information processing method comprises:
   receiving voice information;
   performing semantic understanding on the voice information to convert the voice information into text information;
   obtaining a field probability that the text information belongs to each of M event fields, wherein the M event field are preset in the terminal, and wherein the field probability represents a possibility that the text information belongs to one of the M event fields;
   obtaining a prior probability that the text information belongs to each of N event fields, wherein the prior probability represents a probability that the text information belongs to one of the N event fields based on a plurality of times of performing the semantic understanding, wherein the N event fields in the M event fields, and wherein N is less than or equal to M;
   obtaining confidence that the text information belongs to each of the N event fields, wherein the confidence represents a certainty degree that the text information belongs to one of the N event fields;
   calculating, based on the field probability, the prior probability, and the confidence that the text information belongs to each of the N event fields, wherein values of N probabilities correspond to whether the text information belongs to the N event fields; and
   outputting a semantic understanding result in response to performing the semantic understanding on the text information based on an event field of a largest probability value in the values of N probabilities.

2. The voice information processing method of claim 1, wherein the N event fields are a plurality of first N event fields in the M event fields when N is less than M, wherein the first N event fields are in descending order of the field probabilities, and wherein N is greater than or equal to 2.

3. The voice information processing method of claim 1, wherein after obtaining the field probability, the voice information processing method further comprises performing the semantic understanding on the text information in the N event fields to obtain N semantic understanding results.

4. The voice information processing method of claim 1, wherein each of the M event fields corresponds to a keyword model, wherein the keyword model comprises a plurality of keywords of a corresponding event field, and wherein the voice information processing method further comprises:
   performing segmentation processing on the text information;

extracting a segmented word;
obtaining information about distribution of one of the keywords of the segmented word in the keyword model of each of the M event fields; and
calculating the confidence that the text information belongs to each of the N event fields based on the distribution information.

5. The voice information processing method of claim 1, further comprising:
performing segmentation processing on the text information;
extracting a segmented word;
searching a database model of each of the M event fields for a first feature of the segmented word, wherein the database model comprises a plurality of features, a weight of each of the features, and a segmented word of each of the features, wherein the weight indicates a probability that a second feature of the weight belongs to one of the M event fields of the database model, and wherein each of the M event fields corresponds to the database model; and
calculating the field probability that the text information belongs to each of the M event fields based on the weight of the second feature found in the database model.

6. The voice information processing method of claim 1, wherein each of the M event fields corresponds to a keyword model, wherein the keyword model comprises a plurality of keywords and a probability, based on each of the keywords, indicating the text information belongs to one of the M event fields of the keyword model, wherein the voice information processing method further comprises:
recognizing at least one keyword from the text information;
obtaining a probability from the at least one keyword based on the keyword model of each of the M event fields; and
calculating the field probability that the text information belongs to each of the M event fields based on the probability from the at least one keyword.

7. The voice information processing method of claim 1, further comprising performing an operation of the semantic understanding result after the terminal outputs the semantic understanding result.

8. A terminal, comprising:
a processor; and
a memory coupled to the processor and storing instructions that, when executed by the processor, cause the terminal to be configured to:
receive voice information;
perform semantic understanding on the voice information to convert the voice information into text information;
obtain a field probability that the text information belongs to each of M event fields, wherein the M event fields are preset in the terminal, wherein the field probability represents a possibility that the text information belongs to one of the M event fields;
obtain a prior probability that the text information belongs to each of N event fields, wherein the prior probability represents a probability that the text information belongs to one of the M event fields based on a plurality of times the terminal performs the semantic understanding, wherein the N event fields are N of the M event fields, and wherein N is less than or equal to M;
obtain confidence that the text information belongs to each of the N event fields, wherein the confidence represents a certainty degree that the text information belongs to one of the N event fields;
calculate the prior probability and the confidence that the text information belongs to each of the N event fields based on the field probability, wherein values of N probabilities correspond to whether the text information belongs to the N event fields; and
output a semantic understanding result in response to performing the semantic understanding on the text information based on an event field of a largest probability value in the values of N probabilities.

9. The terminal of claim 8, wherein the N event fields are a plurality of first N event fields in the M event fields when N is less than M, wherein the first N event fields are in descending order of the field probabilities, and wherein N is greater than or equal to 2.

10. The terminal of claim 8, wherein the instructions further cause the terminal to be configured to separately perform the semantic understanding on the text information in the N event fields to obtain N semantic understanding results.

11. The terminal of claim 8, wherein each of the M event fields corresponds to a keyword model, wherein the keyword model comprises a plurality of keywords of the corresponding event field, and wherein the instructions further cause the terminal to be configured to:
perform segmentation processing on the text information;
extract a segmented word;
obtain information about distribution of one of the keywords of the segmented word in the keyword model of each of the M event fields; and
calculate the confidence that the text information belongs to each of the N event fields based on the distribution information.

12. The terminal of claim 8, wherein the instructions further cause the terminal to be configured to:
perform segmentation processing on the text information;
extract a segmented word;
search a database model of each of the M event fields for a first feature of the segmented word, wherein the database model comprises a plurality of features, a weight of each of the features, and a segmented word of each of the features, wherein the weight indicates a probability that a second feature of the weight belongs to one of the M event fields of the database model, and wherein each of the M event fields corresponds to the database model; and
calculate the field probability that the text information belongs to each of the M event fields based on the weight of the second feature found in the database model.

13. The terminal of claim 8, wherein each of the M event fields corresponds to a keyword model, wherein the keyword model comprises a plurality of keywords and a probability, based on each of the keywords, indicating the text information belongs to one of the M event fields of the keyword model, and wherein the instructions further cause the terminal to be configured to:
recognize at least one keyword from the text information;
obtain a probability from the at least one keyword the keyword model of each of the M event fields; and
calculate the field probability that the text information belongs to each of the M event fields based on the probability from the at least one keyword.

14. The terminal of claim 8, wherein the instructions further cause the terminal to be configured to perform an operation corresponding to the semantic understanding result after the terminal outputs the semantic understanding result.

15. A computer program product comprising computer-executable instructions for storage on a non-transitory computer-readable medium that, when executed by a processor, cause a terminal to:
receive voice information;
perform semantic understanding on the voice information to convert the voice information into text information;
obtain a field probability that the text information belongs to each of M event fields, wherein the M event fields are preset in the terminal, and wherein the field probability represents a possibility that the text information belongs to one of the M event fields;
obtain a prior probability that the text information belongs to each of N event fields, wherein the prior probability represents a probability that the text information belongs to one of the N event fields based on a plurality of times of performing the semantic understanding, wherein the N event fields are N of the M event fields, and wherein N is less than or equal to M;
obtain confidence that the text information belongs to each of the N event fields, wherein the confidence represents a certainty degree that the text information belongs to one of the N event fields;
calculate, based on the field probability, the prior probability, and the confidence that the text information belongs to each of the N event fields, wherein values of N probabilities correspond to whether the text information belongs to the N event fields; and
output a semantic understanding result in response to performing the semantic understanding on the text information based on an event field of a largest probability value in the values of N probabilities.

16. The computer program product of claim 15, wherein the N event fields are a plurality of first N event fields in the M event fields when N is less than M, wherein the first N event fields are in descending order of the field probabilities, and wherein N is greater than or equal to 2.

17. The computer program product of claim 15, wherein the instructions further cause the terminal to separately perform the semantic understanding on the text information in the N event fields to obtain N semantic understanding results.

18. The computer program product of claim 15, wherein each of the M event fields corresponds to a keyword model, wherein the keyword model comprises a plurality of keywords of the corresponding event field, and wherein the instructions further cause the terminal to:
perform segmentation processing on the text information;
extract a segmented word;
obtain information about distribution of one of the keywords of the segmented word in the keyword model of each of the M event fields; and
calculate the confidence that the text information belongs to each of the N event fields based on the distribution information.

19. The computer program product of claim 15, wherein the instructions further cause the terminal to:
perform segmentation processing on the text information;
extract a segmented word;
search a database model of each of the M event fields for a first feature of the segmented word, wherein the database model comprises a plurality of features, a weight of each of the features, and a segmented word of each of the features, wherein the weight indicates a probability that a second feature of the weight belongs to one of the M event fields of the database model, and wherein each of the M event fields corresponds to the database model; and
calculate the field probability that the text information belongs to each of the M event fields based on the weight of the second feature found in the database model.

20. The computer program product of claim 15, wherein each of the M event fields corresponds to a keyword model, wherein the keyword model comprises a plurality of keywords and a probability, based on each of the keywords, indicating the text information belongs to one of the M event fields of the keyword model, and wherein the instructions further cause the terminal to:
recognize at least one keyword from the text information;
obtain a probability from the at least one keyword based on the keyword model of each of the M event fields; and
calculate the field probability that the text information belongs to each of the M event fields based on the probability from the at least one keyword.

* * * * *